United States Patent [19]

Furuya et al.

[11] Patent Number: 4,532,629
[45] Date of Patent: Jul. 30, 1985

[54] APPARATUS FOR ERROR CORRECTION

[75] Inventors: Tsuneo Furuya; Tadashi Fukami, both of Tokyo, Japan

[73] Assignee: Sony Corporation, Tokyo, Japan

[21] Appl. No.: 459,128

[22] Filed: Jan. 19, 1983

[30] Foreign Application Priority Data

Jan. 19, 1982 [JP] Japan .................................. 57-6543

[51] Int. Cl.$^3$ ............................................ G06F 11/10
[52] U.S. Cl. ........................................ 371/38; 371/39; 371/44
[58] Field of Search ........................ 371/39, 40, 44, 45, 371/37, 38

[56] References Cited

U.S. PATENT DOCUMENTS

| | | | |
|---|---|---|---|
| 3,231,858 | 1/1966 | Tuomenoksa et al. | 371/38 |
| 4,291,406 | 9/1981 | Bahl et al. | 371/44 |
| 4,360,916 | 11/1982 | Kustedjo et al. | 371/37 |
| 4,398,224 | 8/1983 | Wantanabe | 371/38 X |
| 4,433,415 | 2/1984 | Kojima | 371/37 |
| 4,437,185 | 3/1984 | Sako et al. | 371/39 |

Primary Examiner—Charles E. Atkinson
Assistant Examiner—M. Ungerman
Attorney, Agent, or Firm—Lewis H. Eslinger; Alvin Sinderbrand

[57] ABSTRACT

In apparatus for error correction in which data sequences containing blocks of data, previously arranged on a known time-base, and formed of data words and check words are written into a memory under control of a write address generator, and the data sequences are subsequently read out from the memory under control of a write address generator, so as to generate rearranged data sequences; during writing and reading of the data sequences, error correction is carried out by apparatus that includes an error correction arithmetic circuit for performing the error correction calculation, a pointer addition circuit for adding a pointer to the data words in association with an error state of the blocks, and a memory for memorizing a microprogram having fields to control the error correction arithmetic circuit and pointer addition circuit.

12 Claims, 28 Drawing Figures

FIG. 2
| 16 | | | | | | | | | | | | | | | |
|---|---|---|---|---|---|---|---|---|---|---|---|---|---|---|---|
| SYNC | $U_1$ | $U_2$ | $U_3$ | $U_4$ | $U_5$ | $U_6$ | $U_7$ | $U_8$ | --- | $U_{28}$ | $U_{29}$ | $U_{30}$ | $U_{31}$ | $U_{32}$ |
|←——— 1 TRANSMISSION BLOCK (8×32+16=272 BITS) ———→|
FIG. 5
$$H_{C2} \cdot V^T = \begin{pmatrix} S_{20} \\ S_{21} \\ S_{22} \\ S_{23} \end{pmatrix}$$
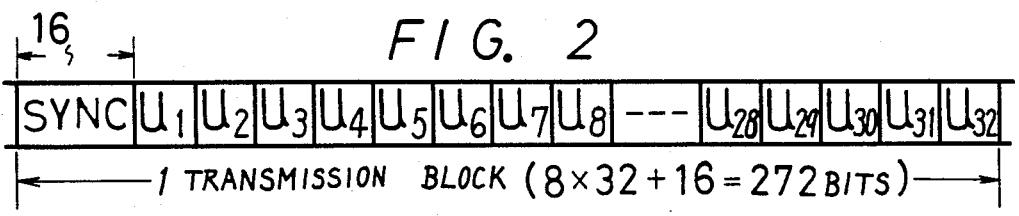
FIG. 6
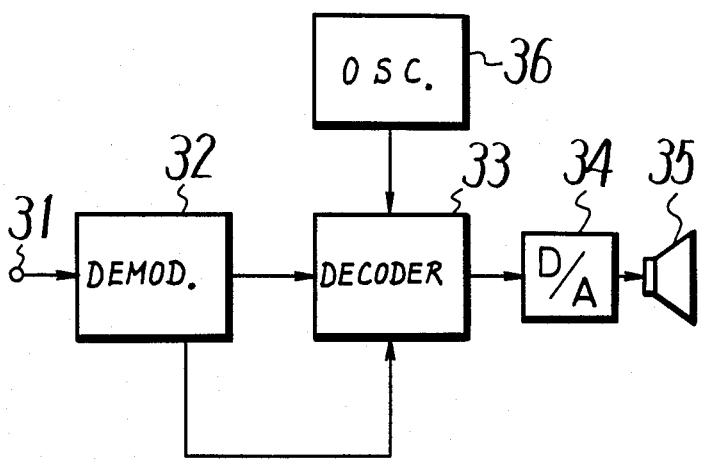

FIG. 4

$$H_{C1} \cdot V^T = \begin{bmatrix} S_{10} \\ S_{11} \\ S_{12} \\ S_{13} \end{bmatrix}$$

$$= \begin{bmatrix} 1 & 1 & 1 & 1 & 1 & \text{---} & 1 & 1 & 1 & 1 & 1 \\ \alpha^{31} & \alpha^{30} & \alpha^{29} & \alpha^{28} & \alpha^{27} & \text{---} & \alpha^4 & \alpha^3 & \alpha^2 & \alpha^1 & 1 \\ \alpha^{62} & \alpha^{60} & \alpha^{58} & \alpha^{56} & \alpha^{54} & \text{---} & \alpha^8 & \alpha^6 & \alpha^4 & \alpha^2 & 1 \\ \alpha^{93} & \alpha^{90} & \alpha^{87} & \alpha^{84} & \alpha^{81} & \text{---} & \alpha^{12} & \alpha^9 & \alpha^6 & \alpha^3 & 1 \end{bmatrix} \begin{bmatrix} W_{12n-12,A} \\ W_{12n-12(1D+1),B} \\ W_{12n+1-12(2D+1),A} \\ W_{12n+1-12(3D+1),B} \\ W_{12n+4-12(4D+1),A} \\ W_{12n+4-12(5D+1),B} \\ W_{12n+5-12(6D+1),A} \\ W_{12n+5-12(7D+1),B} \\ W_{12n+8-12(8D+1),A} \\ W_{12n+8-12(9D+1),B} \\ W_{12n+9-12(10D+1),A} \\ W_{12n+9-12(11D+1),B} \\ Q_{12n-12(12D)} \\ Q_{12n+1-12(13D)} \\ Q_{12n+2-12(14D)} \\ Q_{12n+3-12(15D)} \\ W_{12n+2-12(16D),A} \\ W_{12n+2-12(17D),B} \\ W_{12n+3-12(18D),A} \\ W_{12n+3-12(19D),B} \\ W_{12n+6-12(20D),A} \\ W_{12n+6-12(21D),B} \\ W_{12n+7-12(22D),A} \\ W_{12n+7-12(23D),B} \\ W_{12n+10-12(24D),A} \\ W_{12n+10-12(25D),B} \\ W_{12n+11-12(26D),A} \\ W_{12n+11-12(27D),B} \\ P_{12n} \\ P_{12n+1} \\ P_{12n+2} \\ P_{12n+3} \end{bmatrix}$$

FIG. 9A
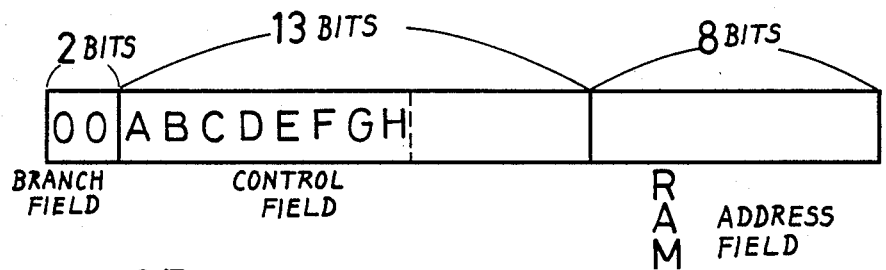
FIG. 9B
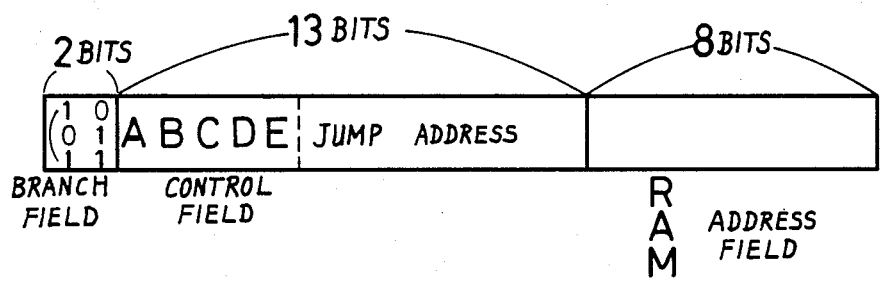
FIG. 10
| BRANCH FIELD | CONTROL FIELD | RAM ADDRESS FIELD |
|---|---|---|
| 0 0 | 0 0 1 1 0 1 1 1 | 3 F |
| 0 0 | 0 0 1 1 0 1 1 1 | 3 E |
| 0 0 | 0 0 1 1 0 1 1 1 | 3 D |
| 0 0 | 0 0 1 1 0 1 1 1 | 3 C |
| ⋮ | ⋮ | ⋮ |
| 0 0 | 0 0 1 1 0 1 1 1 | 3 0 |
| ⋮ | ⋮ | ⋮ |
| 0 0 | 0 0 1 1 0 1 1 1 | 2 F |
| ⋮ | ⋮ | ⋮ |
| 0 0 | 0 0 1 1 0 1 1 1 | 2 3 |

$\times \alpha^{-1}$ $\times \alpha^{-2}$ $\times \alpha^{-3}$

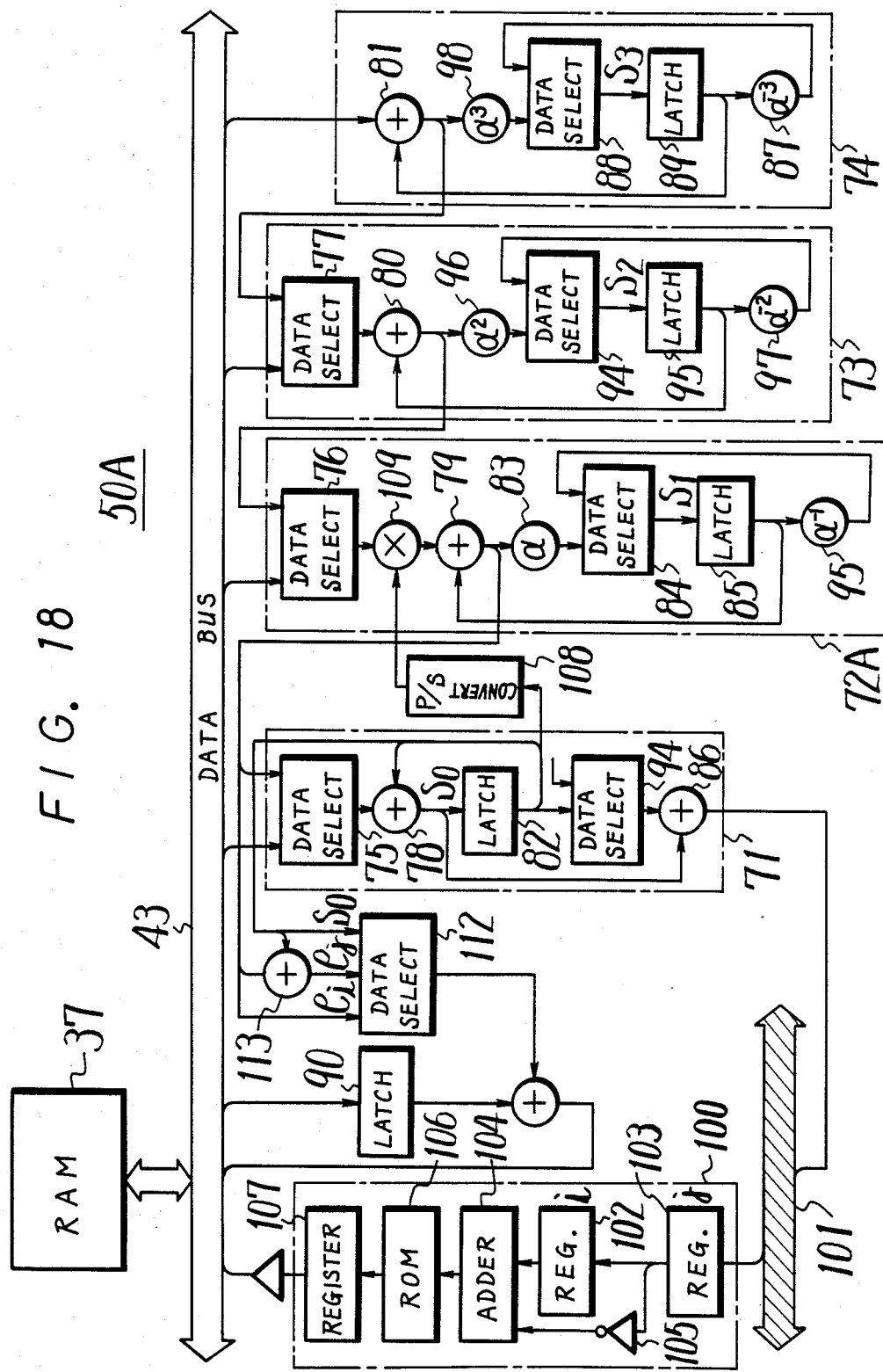
F I G. 18

APPARATUS FOR ERROR CORRECTION

BACKGROUND OF THE INVENTION

1. Field of the Invention

This invention relates generally to apparatus for error correction and specifically to error correction apparatus suitable for use in a complex data transmission system involving arrangement and rearrangement of data sequences on a known time-base.

2. Description of the Prior Art

It has been previously proposed to use a so-called cross-interleave technique in a data transmission system that is effective in correcting burst errors (for example, see Japanese patent applications Nos. 47247/78, 67608/80 and 84428/80). According to this cross-interleave technique, one word contained in each of a number of pulse code modulated (PCM) data sequences in a first arrangement state is placed on a plurality of channels and is fed to a first error correction encoder, wherein a first check word series is generated. The first check word series and the PCM data sequences on a plurality of channels are converted to a second arrangement state, and one word contained in each of the newly arranged channels is supplied to a second error correction encoder, wherein a second check word series is generated. By means of the foregoing, double interleaving processing, involving the rearrangement of a known arrangement state, is carried out in each word unit. The purpose of the interleaving technique is to disperse the check words and the PCM data contained in the common error correction block and then to transmit the same, thereby reducing the number of error words within the plural words contained in a common error correction block when the transmitted signals are reconverted to the original arrangement state at the receiving side. In other words, when burst error occurs upon transmission, such burst error can be dispersed among the plurality of channels of the system. Doubling the above-described interleaving processing allows the first and second check words to form independent error correction blocks, so that even when an error can not be corrected by one check word, such error can be corrected by the other check word, thereby expanding the error correction ability provided by the interleaving processing.

The apparatus to accomplish the above-described error correction for such data transmission system is required to perform complex calculation processing for error correction and de-interleaving processing (rearrangement). Accordingly, constructing the error correction apparatus by random discrete logic devices requires many complex interconnections. Moreover, to integrate the logic circuit into a large-scale integrated circuit (LSI) is very disadvantageous due to the requirement for an excessively large surface area made necessary by the complexity of the circuit.

On the other hand, in using a microprocessor or apparatus having a microprogram system, and when the calculation processing is quite complicated, it is considered advantageous to arrange function blocks for the calculation processing in parallel and to control these function blocks by a so-called horizontal microprogram system. Thus, the respective function blocks simultaneously carry out the calculation processings, thereby providing much faster calculation processings.

In such calculation apparatus using a microprogram system, it is desired to control simultaneously the function blocks as much as possible so that calculation processing can be executed with increased efficiency. However, to control a number of function blocks simultaneously, the number of bits in one step has to be increased, requiring a corresponding increase in the capacity of the memory for memorizing the microprogram, and necessitating an increase in the size of the read-only memory (ROM).

OBJECTS AND SUMMARY OF THE INVENTION

Accordingly, it is an object of this invention to provide apparatus for error correction having a simple arrangement that is capable of correcting error efficiently.

It is another object of this invention to provide apparatus for error correction that can individually and simultaneously control an arithmetic circuit for error correction and a pointer addition circuit, by a microprogram contained within a memory.

Still another object of this invention is to provide apparatus for error correction that employs a calculation apparatus as part of a microprogram system capable of controlling a large number of function blocks without requiring an increase in the capacity of the memory in which the microprogram is stored.

A further object of this invention is to provide apparatus for error correction using a multiplication circuit of simple arrangement that is capable of carrying out multiplication on a Galois field GF $(2^n)$.

A still further object of this invention is to provide apparatus for error correction which requires only a relatively small capacity of memory but which can perform a large number of calculation processings efficiently.

Yet a further object of this invention is to provide an apparatus for error correction that can carry out multiplication on Galois field GF $(2^n)$ through the use of conventional logical circuit elements, such as an exclusive OR circuit for modulo 2 addition and multiplication, an AND circuit, an exclusive-OR circuit to act as an $\alpha$-multiplier, and a flip-flop circuit for delay or the like.

According to an aspect of the present invention, in apparatus for error correction in which data sequences containing blocks, each formed of plural data words previously arranged on a known time-base, and check words are written in a memory under control of a write address generator, and then the data sequences are read out from the memory under control of a read address generator to generate rearranged data sequences: during writing and reading of said data sequences, error correction is carried out by an error correction arithmetic circuit for performing an error correction calculation; a pointer addition circuit for adding a pointer to the data words in association with an error state of the blocks; and a memory for memorizing a microprogram with fields to control the error correction arithmetic circuit and the pointer addition circuit.

The above, and other objects, features, and advantages of the present invention, will become apparent from the following description to be read in conjunction with the accompanying drawings, in which like references designate the same elements and parts.

BRIEF DESCRIPTION OF THE DRAWINGS

FIG. 2 is a diagrammatic representation of a transmission block of data, with which the present invention is useful;

FIG. 4 is a diagrammatic representation of a multiplication of the parity check matrix and the vector words for forming the syndromes of the invention;

FIG. 5 is a diagrammatic representation of a multiplication of the second parity check matrix and the vector words for forming the syndromes of the invention;

FIG. 6 is a schematic block diagram showing the major components of an apparatus for error correction according to an embodiment of this invention;

FIGS. 9A and 9B are diagrams showing formats of a microprogram contained in a read only memory in the decoding section of FIG. 7;

FIG. 10 is a diagram showing an example of the format in FIGS. 9A and 9B;

FIG. 18 is a schematic block diagram form of an example of an arithmetic circuit for one word error correction in the circuit of FIG. 16;

DESCRIPTION OF PREFERRED EMBODIMENTS

Figure 1A:
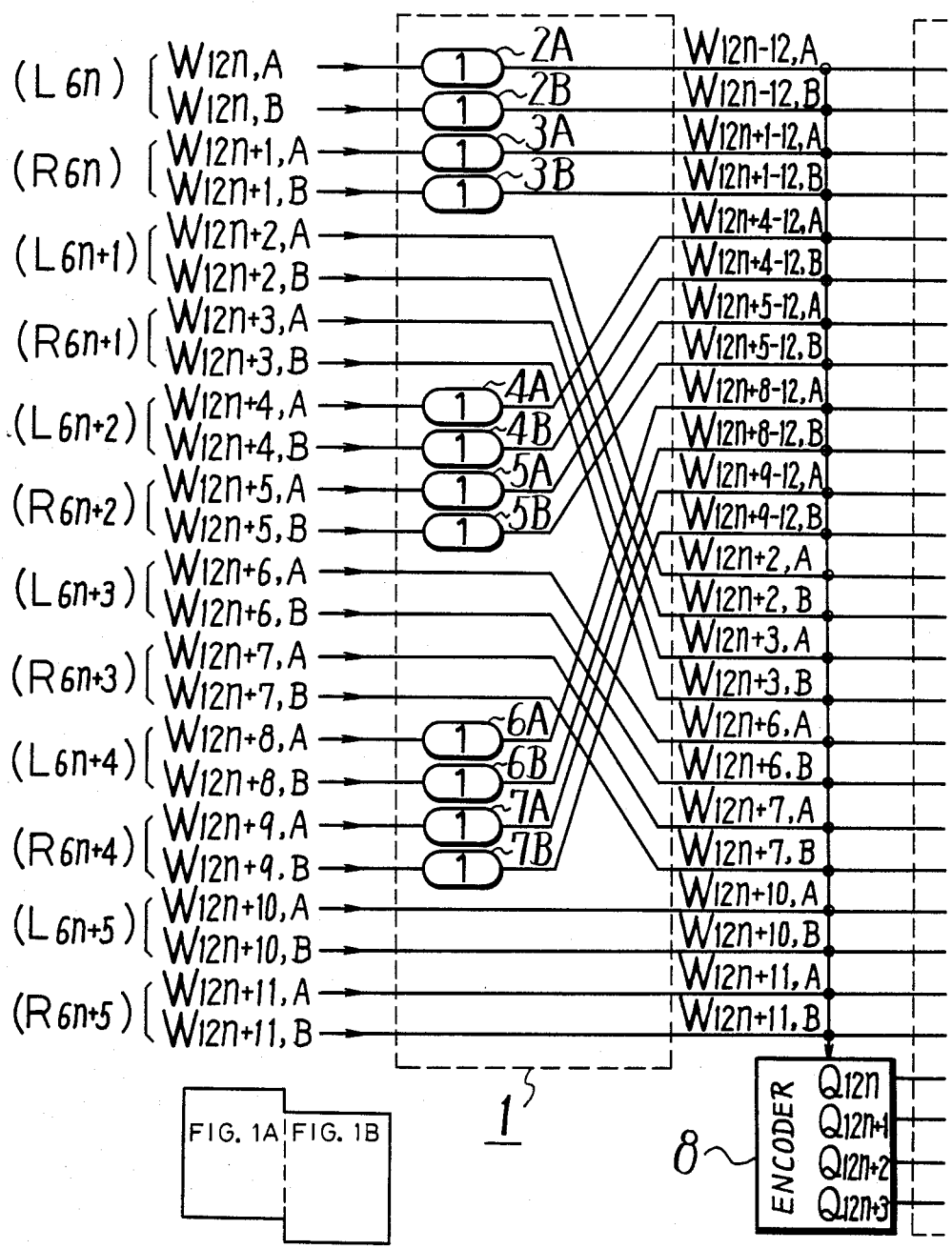
FIGS. 1A and 1B are schematic diagrams that together show an error correction encoder that performs interleaving.

Before describing the embodiments of error correction apparatus according to this invention, an error correction code and a transmission system to which the present invention is applicable will be explained.

To describe an error correction code, there is usually employed a vector representation or a representation by a cyclic group. First a vector representation will be considered relative to an irreducible m-th order polynomial F (x) will be considered on Galois field GF (2). On Galois field GF (2), containing only the elements "0" and "1", the irreducible polynomial F(x) has no real root. Therefore, an imaginary or hypothetical root $\alpha$ that can satisfy F(x)=0, will be considered. At this time, elements $0, \alpha, \alpha^2, \alpha^3, \ldots \alpha^{m-1}$ of $2^m$ numbers, each being differently expressed by a power of $\alpha$, including the zero element, constitute an extension Galois field $GF(2^m)$. This extension Galois field $GF(2^m)$ is a polynomial ring with an m-th order irreducible polynomial F(x) on the field GF (2) as a modulo. The element of GF ($2^m$) can be expressed by a linear combination of 1, $\alpha = [x]$, $$\alpha^2 = [x^2], \ldots \alpha^{m-1} = [x^{m-1}].$$

That is, these elements can be expressed as:

$$a_0 + a_1[x] + a_2[x^2] + \ldots + a_{m-1}[x^{m-1}] =$$

$$a_0 + a_1\alpha + a_2\alpha^2 + \ldots + a_{m-1}\alpha^{m-1}$$

or $$(a_{m-1}, a_{m-2} \ldots, a_2, a_1, a_0)$$

where $a_0, a_1 \ldots a_{m-1}$ (GF (p)).

By way of example, Galois field GF ($2^8$) based on eight-bit words is considered. Since all data of 8 bits can be expressed by the irreducible polynomial root (modolo F $$(x) = x^8 + x^4 + x^3 + x^2 + 1)\ as:$$

$$a_7x^7 + a_6x^6 + a_5x^5 + a_4x^4 + a_3x^3 + a_2x^2 + a_1x + a_0\ or$$

$$(a_7, a_6, a_5, a_5, a_4, a_3, a_2, a_1, a_0)$$

$a_7$, for example is assigned to the most significant bit (MSB) side, while $a_0$ is assigned to the least significant bit (LSB) side. $a_n$ belongs to Galois field GF (2) so that it is expressed as either 0 or 1.

The following matrix T of (m x n) is derived from the polynomial F (x).

$$T = \begin{pmatrix} 0 & 0 & \ldots & 0 & a_0 \\ 1 & 0 & \ldots & 0 & a_1 \\ 0 & 1 & \ldots & 0 & a_2 \\ . & . & & & . \\ . & . & & & . \\ . & . & & & . \\ 0 & 0 & \ldots & 1 & a_{m-1} \end{pmatrix}$$

Another representation of the error correction code is based on the cyclic group. This utilizes a fact that remaining elements, except the zero element, on the extension field GF ($2^m$) form a multiplicative group of $2^m-1$ order. Expressing the elements of the extension Galois field GF ($2^m$) by the cyclic group yields:

$$0, 1 (= 2^{m-1}), 2, 3, \ldots 2^m - 2$$

When one word is formed of m bits and one block is formed of n words, this invention arranges the following parity check matrix H to generate k check words as:

$$H = \begin{pmatrix} 1 & 1 & \cdots & 1 & 1 \\ \alpha^{n-1} & \alpha^{n-2} & \cdots & \alpha & 1 \\ \alpha^{2(n-1)} & \alpha^{2(n-2)} & & \alpha^2 & 1 \\ \cdot & \cdot & & \cdot & \cdot \\ \cdot & \cdot & & \cdot & \cdot \\ \alpha(k-1)(n-1) & \alpha(k-1)(n-2) & & \alpha k-1 & 1 \end{pmatrix}$$

The parity check matrix H can also be similarly expressed by using the matrix T as:

$$H = \begin{pmatrix} I & I & \cdots & 1 & 1 \\ T^{n-1} & T^{n-2} & \cdots & T^1 & I \\ T^{2(n-1)} & T^{2(n-2)} & \cdots & T^2 & I \\ \cdot & \cdot & & \cdot & \cdot \\ \cdot & \cdot & & \cdot & \cdot \\ T^{(k-1)(n-1)} & T^{(k-1)(n-2)} & \cdots & T^{k-1} & I \end{pmatrix}$$

where I is a unit matrix of (m x m).

As described above, the representations employing the root $\alpha$ and the matrix T are substantially identical with each other.

Using four (k=4) check words, for example, the parity check matrix H is given as:

$$H = \begin{matrix} 1 & 1 & \cdots & 1 & 1 \\ \alpha^{n-1} & \alpha^{n-2} & \cdots & & 1 \\ \alpha^{2(n-1)} & \alpha^{2(n-2)} & \cdots & & 1 \\ \alpha^{3(n-1)} & \alpha^{3(n-2)} & \cdots & \alpha^3 & 1 \end{matrix}$$

Arranging one block of the received data as a column vector $\overline{V} = \hat{w}_{n-1}, \hat{w}_{n-2}, \ldots, \hat{w}_1, \hat{w}_0$, where $\hat{w}_i = w_i + e_i$, and $e_i$ represents error patterns, yields four syndromes $S_0, S_1, S_2$, and $S_3$ in the receiving side as given by:

$$\begin{pmatrix} S_0 \\ S_1 \\ S_2 \\ S_3 \end{pmatrix} = H \cdot V^T$$

This error correction code can correct up to two words in error within one error correction block and, if the error location is known, three words error or four words error can be corrected.

One error correction block contains four check words ($p=w_3$, $q=w_2$, $r=w_1$ and $s=w_0$). These check words are searched for as follows:

$$P + q + r + s = \Sigma w_i = a$$

$$\alpha^3 p + \alpha^2 q + \alpha r + s = \Sigma \alpha^i w_i = b$$

$$\alpha^6 p + \alpha^4 q + \alpha^2 r + s = \Sigma \alpha^{2i} w_i = c$$

$$\alpha^9 p + \alpha^6 q + \alpha^3 r + s = \Sigma \alpha^{3i} w_i = d$$

where $\Sigma$ is $$\sum_{i=4}^{n-1}$$

Omitting the calculation process, only the result is given as:

$$\begin{pmatrix} p \\ q \\ r \\ s \end{pmatrix} = \begin{pmatrix} \alpha^{212} & \alpha^{153} & \alpha^{152} & \alpha^{209} \\ \alpha^{156} & \alpha^2 & \alpha^{135} & \alpha^{152} \\ \alpha^{158} & \alpha^{138} & \alpha^2 & \alpha^{153} \\ \alpha^{218} & \alpha^{158} & \alpha^{156} & \alpha^{212} \end{pmatrix} \begin{pmatrix} a \\ b \\ c \\ d \end{pmatrix}$$

A role of the encoder provided at the transmitting side is to generate the check words, p, q, r, and s described above.

Next, an explanation will be given regarding the fundamental algorithm for error correction, where data containing the check words p, q, r, and s made so far are transmitted and then received.

[1] For no error: $S_0 = S_1 = S_2 = S_3 = 0$

[2] For one word error (it is noted that error pattern is represented by $e_i$):

$$S_0 = e_i \; S_1 = \alpha^i e_i \; S_2 = \alpha^{2i} e_i \; S_3 = \alpha^{3i} e_i$$

Thus $$\begin{pmatrix} \alpha^i S_0 = S_1 \\ \alpha^i S_1 = S_2 \\ \alpha^i S_2 = S_3 \end{pmatrix} = 1$$

Accordingly, one word error can be identified, if the afore-described relations are established with the error location i changing sequentially.

$$\frac{S_1}{S_0} = \frac{S_2}{S_1} = \frac{S_3}{S_2} = \alpha^i$$

establishes that the error location i can be known by comparing the pattern of $\alpha^i$ with that previously stored in the ROM. The syndrome $S_1$ at that time becomes the error pattern $e_i$ itself.

[3] For two words in error ($e_i, e_j$):

$$\begin{pmatrix} S_0 = e_i + e_j \\ S_1 = \alpha^i e_i + \alpha^j e_j \\ S_2 = \alpha^{2i} e_i + \alpha^{2j} e_j \\ S_3 = \alpha^{3i} e_i + \alpha^{3j} e_j \end{pmatrix}$$

Rearranging the above equations $$\alpha^j S_0 + S_1 = (\alpha^i + \alpha^j) e_i$$

$$\alpha^j S_1 + S_2 = \alpha^i (\alpha^i + \alpha^j) e_i$$

$$\alpha^j S_2 + S_3 = \alpha^{2i} (\alpha^i + \alpha^j) e_i$$

Thus, if $$\alpha^i (\alpha^j S_0 + S_1) = \alpha^j S_1 + S_2.$$

$$\alpha^i (\alpha^j S_1 + S_2) = \alpha^j S_2 + S_3$$

are satisfied, the error is identified as two words in error and the error patterns $e_i$ and $e_j$ are given as $$e_i = \frac{S_0 + \alpha^{-j}S_1}{1 + \alpha^{i-j}} \quad e_j = \frac{S_0 + \alpha^{-i}S_1}{1 + \alpha^{j-i}}$$

Next, a practical embodiment of a transmission system will be described with reference to FIGS. 1 through 5. This transmission system relates to a recording and reproducing system for audio pulse code modulation (PCM) signals and, more specifically, relates to a magnetic recording and reproducing apparatus and a rotary disc apparatus.

Figure 1B:
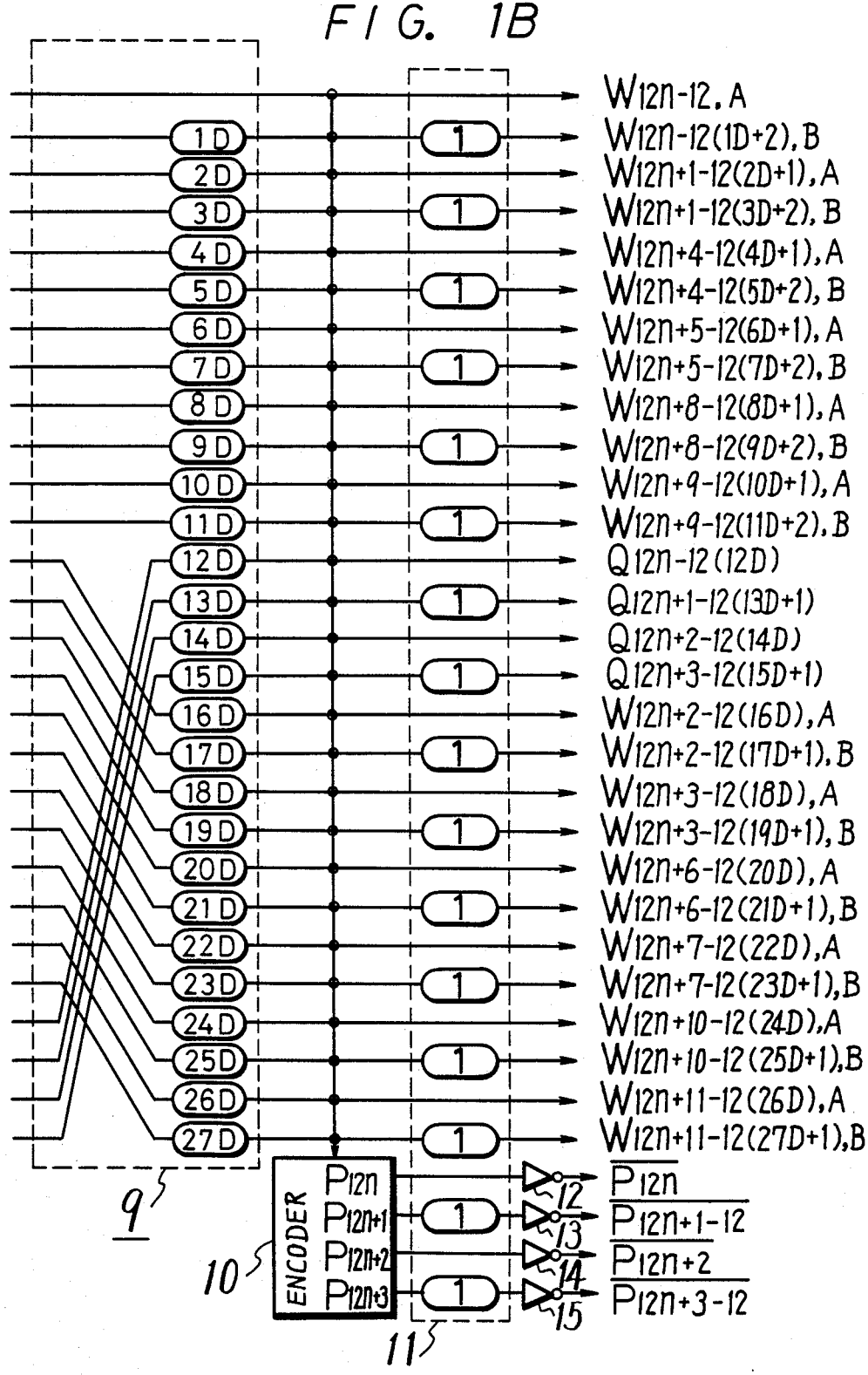

FIG. 1 (formed of FIGS. 1A and 1B) shows an overall arrangement of an error correction encoder in a recording system, which is supplied at its input side with a pulse code modulation (PCM) signal. The audio PCM signal results from sampling right and left stereo signals at a selected sampling frequency $f_s$ (for example, 44.1 kHz) and converting one sample thereof to one word (code with 2 as complement and formed of 16 bits). Accordingly, PCM data with consecutive words such as $L_0, L_1, L_2 \ldots$, are produced for the left-channel audio signal, while PCM data with consecutive words such as $R_0, R_1, R_2 \ldots$, are produced for the right-channel audio signal. PCM data of right and left channels are separated to 6 channels each, and hence PCM data sequences of a total of 12 channels are supplied to the error correction encoder. At a predetermined timing, 12 words, such as $L_{6n}, R_{6n}, L_{6n+1}, R_{6n+1}, L_{6n+2}, R_{6n+2}, L_{6n+3}, R_{6n+3}, L_{6n+4}, R_{6n+4}, L_{6n+5}, R_{6n+5}$ are supplied to the error correction encoder. In the illustrated example, one word is separated into upper 8 bits and lower 8 bits, and the 12 channels are further separated into 24 channels. For simplicity, one word of PCM data is represented as $w_i$, and the upper 8 bits and the lower 8 bits of one word are discriminated from each other by the addition of suffix A as $w_{i,A}$ and suffix B as $w_{i,B}$, for example, the word $L_{6n}$ is separated to $w_{12n,A}$ and $w_{12n,B}$.

The PCM data sequences of the 24 channels are supplied to odd-even interleaver 1. If n is given as 0, 1, 2, . . . , each of $L_{6n}$ ($=w_{12n,A}$, $w_{12n,B}$), $R_{6n}$ ($=w_{12n+1,A}$, $w_{12n+1,B}$), $L_{6n+2}$ ($=w_{12n+4,A}$, $w_{12n+4,B}$) $R_{6n+2}$ ($=w_{12n+5,A}$, $w_{12n+5,B}$), $L_{6n+4}$ ($=w_{12n+8,A}$, $w_{12n+8,B}$), $R_{6n+4}$ ($=w_{12n+9,A}$, $w_{12n+9,B}$) is an even-numbered word and other words except the above words are odd-numbered words. The PCM data sequences formed of even-numbered words are delayed by a time equal to one word by one-word delay circuits 2A, 2B, 3A, 3B, 4A, 4B, 5A, 5B, 6A, 6B, 7A, and 7B in odd-even interleaver 1. It is, of course, possible to delay them by a time longer than one word, for example, 8 words. Odd-even interleaver 1 allows 12 data sequences of even-numbered words to be converted so as to occupy 1st and 12th transmission channels and 12 data sequences of odd-numbered words to be converted so as to occupy the 13th and 24th transmission channels.

The purpose of odd-even interleaver 1 is to prevent each of the right and left stereo signals from having two or more consecutive errors words and also to prevent this error word from being made uncorrectable. By way of example, three consecutive words $L_{i-1}, L_i, L_{i+1}$ are considered, the word $L_i$ is erroneous and this error word is uncorrectable, it is desired that either word $L_{i-1}$ or $L_{i+1}$ be correct. This is because when the erroneous data or word $L_i$ is corrected, the erroneous word $L_i$ is interpolated by the immediately preceding correct word $L_{i-1}$ (pre-value holding) or by a mean value between words $L_{i-1}$ and $L_{i+1}$. The purpose of delay circuits 2A, 2B through 7A, 7B in odd-even interleaver 1 is to rearrange the adjacent words to be contained in different error correction blocks. The reason why the transmission channel is combined at every data sequence formed of even-numbered words and at every data sequence formed of odd-numbered words, is that when they are interleaved, the distance between recording positions of adjacent even-numbered words and odd-numbered words could be made as large as possible.

The output from odd-even interleaver 1 contains PCM data sequences of 24 channels in the first arrangement state, from which one word each is derived and then conveyed to encoder 8, where first check words $Q_{12n}, Q_{12n+1}, Q_{12n+2}$, and $Q_{12n+3}$ are formed therefrom. A first error correction block containing the first check words $Q_{12n}, Q_{12n+1}, Q_{12n+2}$, and $Q_{12n+3}$ are given as:

$w_{12n-12,A}, w_{12n-12,B}, w_{12n+1-12,A}, w_{12n+1-12,B},$ $w_{12n+4-12,A}, w_{12n+4-12,B}, w_{12n+5-12,A}, w_{12n+5-12,B},$ $w_{12n+8-12,A}, w_{12n+8-12,B}, w_{12n+9-12,A}, w_{12n+9-12,B},$ $w_{12n+2,A}, w_{12n+2,B}, w_{12n+3,A}, w_{12n+3,B},$ $w_{12n+6,A}, w_{12n+6,B}, w_{12n+7,A}, w_{12n+7,B},$ $w_{12n+10,A}, w_{12n+10,B}, w_{12n+11,A}, w_{12n+11,B},$ $Q_{12n}, Q_{12n+1}, w_{12n+2}, w_{12n+3}$

First encoder 8 carries out such encoding so that the number of words contained in one block is n=28, the number of bits in one word is n=8, and the number of check words is k=4.

24 PCM data sequences and 4 check word series are supplied to interleaver 9 that changes the position of the transmission channels so that the check word series is interposed between the PCM data sequences of even-numbered words and odd-numbered words, and then carries out the delay process for interleaving. The delay processing of interleaver 9 is performed by connecting delay circuits with delay amounts or times of 1D, 2D, 3D, 4D, . . . , 26D, 27D (where D represents a unit delay amount of, for example, 4 words) to 27 transmission channels, respectively, except the first transmission channel.

In the output from interleaver 9 are 28 data sequences in the second arrangement state, from which one word each is derived and then supplied to encoder 10, thereby generating second check words $P_{12n}, P_{12n+1}, P_{12n+2}, P_{12n+3}$. A second error correction block of 32 words which contains the second check words $P_{12n}, P_{12n+1}, P_{12n+2}, P_{12n+3}$, becomes as follows.

$w_{12n-12,A}, w_{12n-12(D+2),B}, w_{12n+1-12(2D+1),A'}$ $w_{12n+1-12(3D+2),B'} w_{12n+4-12(4D+1),A'}$ $w_{12n+4-12(5D+2),B},$ $w_{12n+5-12(6D+1),A}, w_{12n+5-12(7D+2),B}, \cdots$ $Q_{12n-12(12D)}, Q_{12n+1-12(13D+1)}, Q_{12n+2-12(14D)},$ $Q_{12n+3-12(15D+1)}, \cdots w_{12n+10-12(24D),A},$ $w_{12n+10-12(25D+1)}, w_{12n+11-12(26D),A},$ $w_{12n+11-12(27D+1),B}, P_{12n}, P_{12n+1-12}, P_{12n+2},$ $P_{12n+3-12}$ Interleaver 11 is provided with one-word delay circuits connected to even-numbered transmission channels, within 32 data sequences containing the first and second check words. Inverters 12, 13, 14, and 15 are also connected to the second check word series after the delay circuits, where applicable. Interleaver 11 prevents an error word extending over the boundary between the adjacent error correction blocks from becoming one of the uncorrectable error words. Moreover, inverters 12 to 15 are used to prevent such a misoperation from occurring due to drop out upon transmission, whereby all data in one block are made "0"s and identified by the playback system as correct. It is also possible to connect inverters to the first check word series to accomplish this same purpose.

The PCM data are arranged in series formed of 32 words made up of 24 PCM data sequences and 8 check word series, as shown in FIG. 2. Additionally, a synchronizing signal of, for example, 16 bits is added to the beginning of the data to form one transmission block, which is then transmitted. In FIG. 2, one word derived from i-th transmission channel is represented as $u_i$ for simplicity. As another example, a user word of 8 bits may be inserted between the synchronizing signal and data of 32 words.

Encoder 8 is associated with the error correction codes mentioned before, where n=28, m=8, and k=4, while like encoder 10 is associated with the error correction codes where n=32, m=8, and k=4.

Figure 3A:
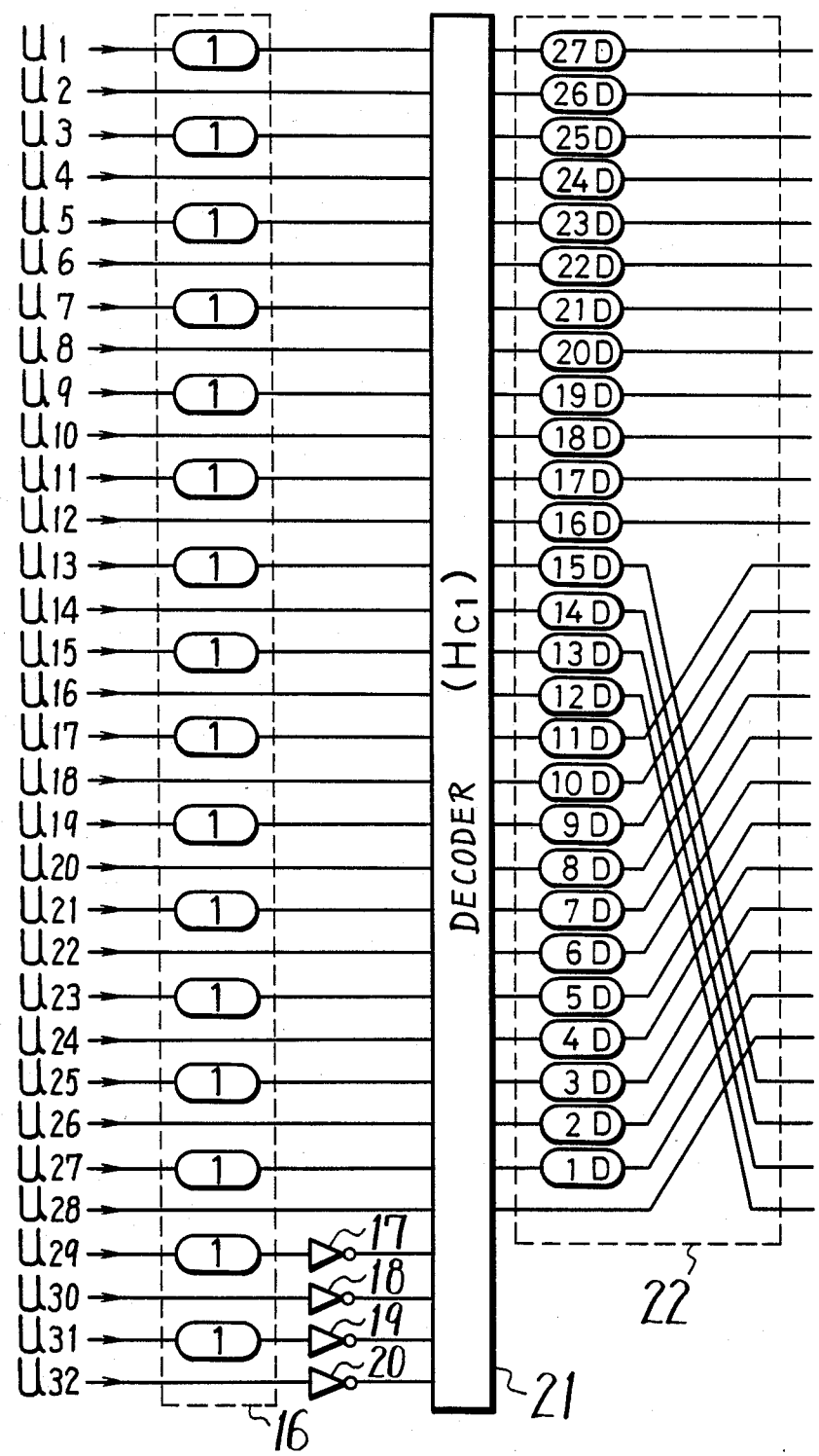
FIGS. 3A and 3B together form a schematic diagram of an error correction decoder.
Figure 3B:
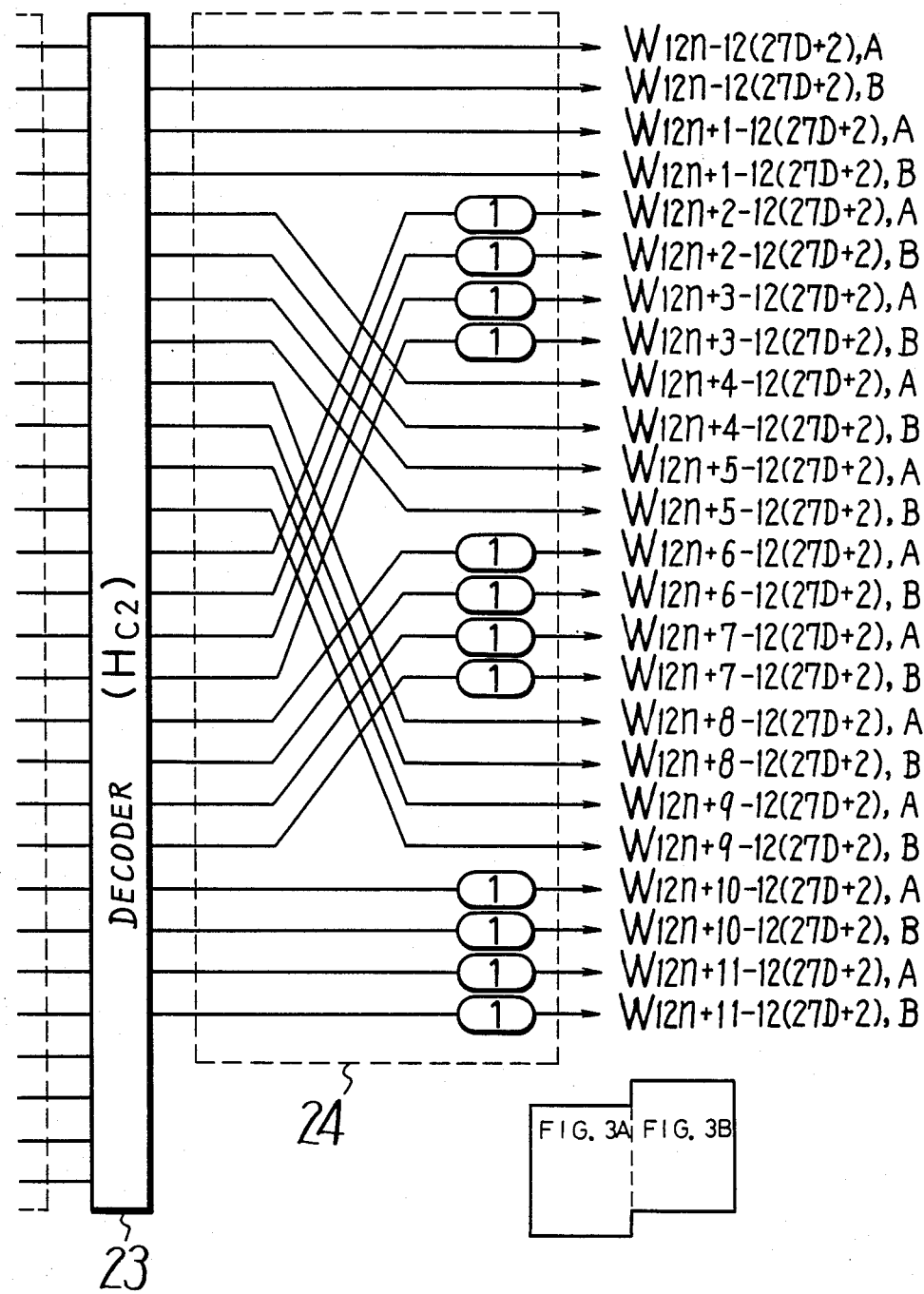

The reproduced data are supplied to an error correction decoder shown in FIGS. 3A and 3B for every 32 words of one transmission block. Because this is reproduction data, there is the possibility that the data will contain error. If no error is present, the 32 words that will be applied to the input of this error correction decoder will coincide with the 32 words appearing at the output of the error correction encoder. The error correction decoder carries out de-interleave processing corresponding to the interleave processing in the encoder, returns the data to its original order, and then performs the error correction thereof.

In the error correction encoder, there is provided de-interleaver 16 that comprises a number of one-word delay circuits connected to all odd-numbered transmission channels, and inverters 17, 18, 19, and 20 are connected to the check word series. The outputs from the de-interleaver and those from inverters 17 and 20 are supplied to first decoder 21. In first decoder 21, as represented in FIG. 4, syndromes $S_{10}$, $S_{11}$, $S_{12}$, and $S_{13}$ are generated from a parity check matrix $H_{c1}$ and 32 words ($V^T$) supplied thereto, and error correction as mentioned before is carried out on the basis of the syndromes $S_{10}$, $S_{11}$, $S_{12}$, and $S_{13}$. FIG. 4 shows an element of Galois field GF ($2^8$) for $F(x)=x^8+x^4+x^3+x^2+1$, the irreducible polynomial root. From decoder 21 appear 24 PCM data sequences and 4 check word series, and the data sequence is added for each word having a pointer of at least 1 bit indicating the presence or absence of error (the pointer is "1" for the presence of error and "0" for the absence of error). In FIG. 4 and FIG. 5, which will be described later, as well as in the description below, the received one word $w_i$ is simply represented as $\hat{w}_i$ for brevity.

The output data sequences from decoder 21 are supplied to de-interleaver 22 to cancel out delays caused by interleaver 9 in the error correction encoder. The 1st to 27th transmission channels are respectively connected with delay circuits with different delays, as 27D, 26D 25D, ... 2D, 1D. The outputs from de-interleaver 22 are supplied to a second decoder 23. In decoder 23, as represented in FIG. 5, syndromes $S_{20}$, $S_{21}$, $S_{22}$, and $S_{23}$ are generated from a parity check matrix $H_{c2}$ and the 28 words supplied thereto, and error correction is carried out on the basis of the syndromes $S_{20}$, $S_{21}$, $S_{22}$, and $S_{23}$.

Data sequences appearing in the output of second decoder 23 are supplied to odd-even de-interleaver 24 that rearranges PCM data sequences of even-numbered words and odd-numbered words into alternate transmission channels, and the PCM data sequences of odd-numbered words are connected with one-word delay circuits. Thus, at the output of odd-even de-interleaver 24 appear PCM data sequences with wholly similar arrangement to those supplied in predetermined orders to the error correction encoder and transmission channels. A concealment circuit (not shown) may be connected next to odd-even de-interleaver 24 to perform other amendments, for example, to conceal error that encoders 21 and 23 could not correct or to perform a mean value interpolation.

The embodiments of apparatus for error correction according to this invention will be described with reference to FIGS. 6 through 20. FIG. 6 shows an arrangement of the functional blocks of a general embodiment of this invention. The system input is at external input terminal 31 to which non-return-to-zero-inverted (NRZI) data is supplied, for example, from a digital audio disc, and is fed to demodulation section 32 that demodulates data that has been modulated by the modulation system suitable for the digital audio disc, for example, data modulated in the manner of 8 to 14-bit-block-coding. Demodulation section 32 also generates a phase locked loop (PLL) clock signal with a frequency of, for example, 2.16 MHz, and a PLL frame synchronizing (sync) signal from the input data sequence at terminal 31. The data demodulated by demodulation section 32, such as non-return-to-zero (NRZ) data of 2.16M bits/sec, and the aforesaid PLL clock are supplied to decoder or decode section 33 that decodes data coded previously for error-correction. That is, decode section 33 performs the de-interleaving and error correction, as described hereinabove. Data decoded by this decode section 33 is supplied through digital-to-analog (D/A) converter 34 to loudspeaker 35. A crystal-controlled oscillator produces a clock signal and a frame synchronizing signal fed to decoder 33.

Figure 7:
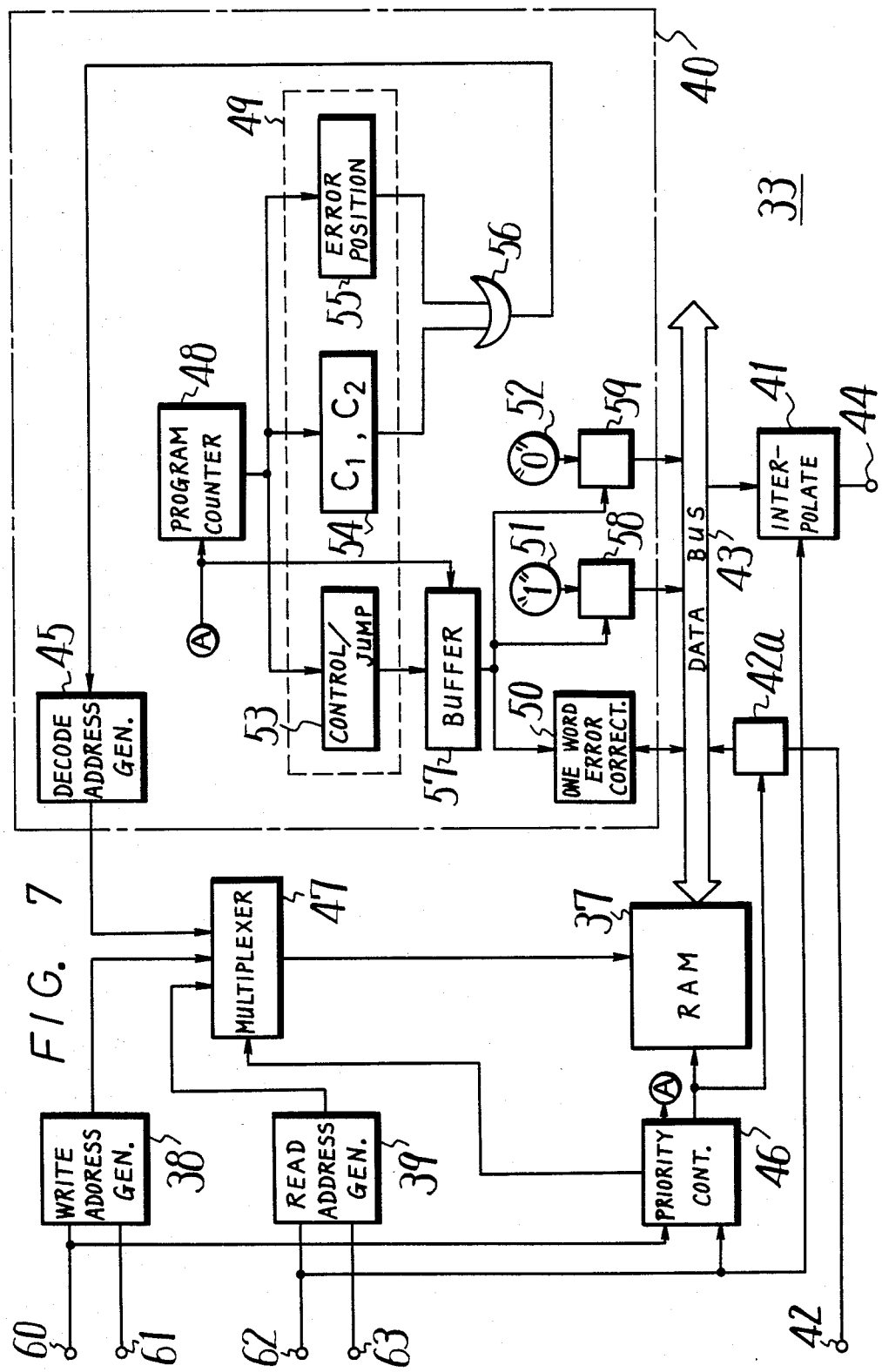
FIG. 7 is a schematic block diagram of a decoding section included in the apparatus of FIG. 6.

FIG. 7 illustrates in detail decode section 33 of FIG. 6. Decode section 33 comprises random access memory (RAM) 37, write address generator 38, read address generator 39, error correction circuit 40, interpolation circuit 41 priority control unit 46, and multiplexer 47. In this embodiment, the demodulated data from demodulation section 32 (FIG. 6) is supplied via data input terminal 42, buffer 42a, and data bus 43 to RAM 37 and then written thereinto in response to the read address from read address generator 39. On the basis of the read address from read address generator 39, the data written into RAM 37 are read out and supplied to the next D/A converter 34 (FIG. 6) via data bus 43, and also supplied to interpolation circuit 41 and data output terminal 44. Writing and reading the data into or out of RAM 37 ensures arrangement of data, namely, de-interleaving of data. PLL clock input terminal 60, PLL frame synchronizing (sync) signal input terminal 61, crystal clock input terminal 62, and crystal frame synchronizing (sync) signal input terminal 63 are connected to receive the appropriate signals, as produced by the system of FIG. 6.

While writing and reading the data, in accordance with the read address from error correction circuit 40, or more specifically in accordance with a decode address from a decode address generator 45, the content stored in the RAM 37 is read out and then corrected for error. Priority control circuit 46 determines the order in which to access RAM 37 may be accessed, as among read address generator 39, write address generator 38, and error correction circuit 40. Multiplexer 47 receives command signals from write address generator 38, read address generator 39, error correction circuit 40, and priority control 46 to provide the appropriate signal to random access memory 37.

In one embodiment of this invention, error correction circuit 40 employs a so-called horizontal microprogram system, that is, one step of the microprogram allows a plurality of function blocks to execute the commands. The error correction circuit 40 comprises program counter 48, read-only memory (ROM) 49, arithmetic circuit for one word error correction 50, pointer addition circuits 51 and 52, decode address generator 45, logical OR gate 56, and buffer register 57. ROM 49 stores the microprogram, and the respective fields of the programmed ROM functionally form control signal/jump address generator 53, C1 decode/C2 decode address generator 54, and error position address generator 55. The C1 decode corresponds to decoder 21 of FIG. 3, while the C2 decode corresponds to the decoder 23, also of FIG. 3. Program counter 48 operates at a functional clock rate derived from the priority control circuit 46, as fed in at terminal (A), the correction operation is performed at this timing, whith the exception of the de-interleaving operation in RAM 37.

In one operative case, an address signal representative of a word to be corrected for error from C1 decode/C2 decode address generator 54 is supplied to decode address generator 45 via logical OR gate 56. Decode address generator 45 is operated by this address signal to access RAM 37 whose pointer is appointed, whereby the number of bits of the address signal from C1 decode/C2 decode address generator 54 are reduced. The data read out from RAM 37 on the basis of signals from both address generators 54 and 45 is transferred through data bus 43 to the arithmetic circuit for one word error correction 50. Then, the control signal from control signal/jump address generator 53 is supplied through buffer register 57 to arithmetic circuit for one word error correction 50, that is, to cause it to execute the computation for error correction of each word in response to this control signal. At this time, the word to be corrected for error, namely, the position of the error, is also identified by the arithmetic circuit for one word error correction 50 and, on the basis of the identified signal, error position address generator 55 generates the error position address to instruct where in the block the word containing error exists. Error position address generator 55 produces an output fed to logical OR circuit 56, having an output when appropriate, that is fed to decode address generator 45, and through multiplexer 47 to RAM 37, which acts to add a pointer of "1" through buffer 58 to the error word and a pointer of "0" through buffer 59 to other words.

Figure 8:
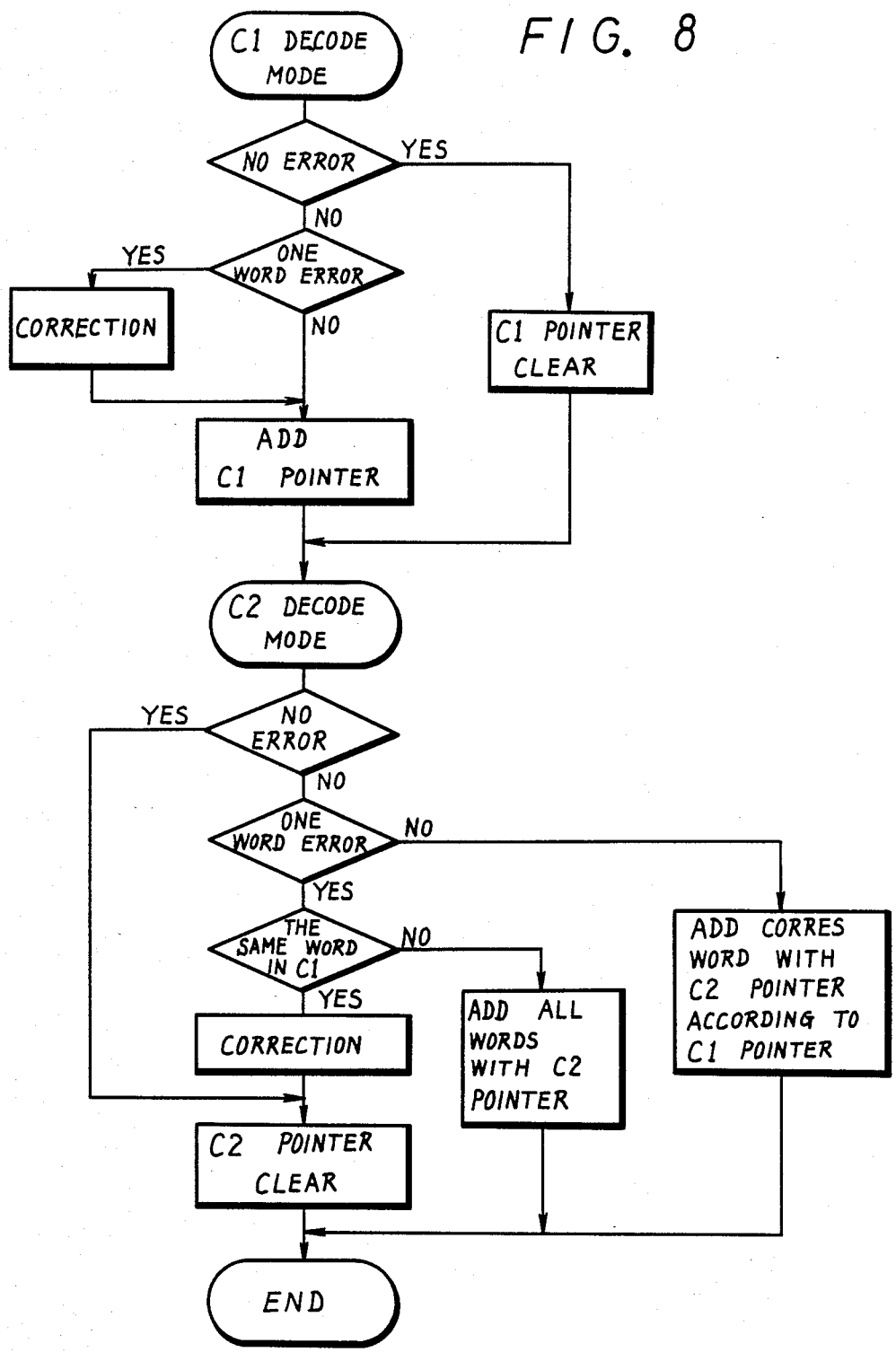
FIG. 8 is a flow chart to which reference will be made in explaining the operation of the decoding section of FIG. 7.

To facilitate the understanding of error correction circuit 40, C1 decode mode and C2 decode mode thereof will be described with reference to the flow chart of FIG. 8. Algorithms of the C1 decode mode and C2 decode mode begin with an operation to identify whether a first error correction code C1 has error. Specifically, in the C1 decode mode, for no error, the C1 pointer is cleared, that is, the pointer is made "0". If there is error, a discrimination is made as to whether the error is one word error or plural word error; for plural word error, the C1 pointer is raised on the word containing error, that is, the pointer is made "1". If there is one word error, the word with an error is corrected and then the C1 pointer is raised on the word containing error.

In the succeeding C2 decode mode, the identification is made of whether a second error correction code contains error or not. For no error, the C2 pointer is cleared, while for error, identification is made as to whether that error is one word error. Thereafter, when one block contains plural word errors, while watching the C1 pointer, the C2 pointer is raised on the word corresponding thereto. For one word error, identification is made as to whether that word is the same as the word on which the C1 pointer was raised and if the word is the same, the error correction is carried out and, further, the C2 pointer is cleared. If the word to which the C1 pointer was added differs from the error word, this is judged as a misdetection and the C2 pointer is raised on all words in the block. In this way, the C2 decode mode is ended.

Referring back to FIG. 7, interpolation circuit 41 monitors the C2 pointer raised on each word as described above and interpolates each word in some fashion, for example, by pre-interpolation or by intermediate-interpolation.

When the contents of calculation processing are quite complicated and complex, as described herein, many more calculation processings can be carried out in a shorter time period by controlling the operation of the function blocks that were arranged in parallel using the horizontal microprogram. To achieve this more satisfactory efficiency in the calculation processing, it is known that the number of bits contained in one step has to be increased, this further requires that the memory capacity for storing the microprogram must be enlarged.

To solve such problem, this invention provides a special format of microprogram, wherein there are microcommands or formats that need jump addresses and those that do not need them. Those microcommands that perform an unconditional jump, or those that identify conditions thereof and then perform a jump in association with the identified result thereof, require the jump address. Microcommands that may simply count up the program counter by +1 and then execute the microcommand of the next address after execution of the command do not require the jump address. According to this invention, a branch field is provided on the format, whereby identification can be made as to whether the format of interest needs the jump address. The format requiring the jump address employs a part of the control field as a jump address field, while the format requiring no jump address allows the control contents to be memorized in all control fields so that many more calculations can be carried out.

One embodiment of a format of microprogram as contained in ROM 49 will be described with reference to FIGS. 9A and 9B. In each of the illustrated formats, one step is formed of 23 bits, which are respectively assigned to branch field of 2 bits, control field of 13 bits and RAM address field of 8 bits. As illustrated, there are two kinds of format as determined by its use, and these two formats are discriminated from each other by the content of the branch field.

For the branch field whose content is "0 0", which means "no operation", the format shown in FIG. 9A is employed and in accordance with this format, in the next cycle, the following step is executed. In the example of FIG. 9A, 8 bits denoted by A to H in the control field of 13 bits are employed, and the contents of commands of bits A to H will be described in detail later. On the other hand, for the branch field "1 0", "0 1" and "1 1", the format shown in FIG. 9B is employed. In this format, 5 bits of A to E in the control field of 13 bits are used as true control bits and the remaining 8 bits are employed as the jump address. In the case where the content of branch field is "1 0", the step moves to a step that the jump address designates, that is, the content of the jump address is transferred to the program counter 48. In the case where the content of branch fields is "0 1" or is "1 1", the pointers "1" and "0", corresponding to the predetermined states, respectively, are identified, thereby to jump the step.

Next, the contents of commands issued by bits A to H in the control field will be described. The commands that the microprogram contained in ROM 49 will execute are roughly classified as:

1. syndrome calculation;
2. judgement of whether syndromes $S_0$ to $S_3$ are all "0"s or not, that is, whether there is error; and
3. error correction and addition of pointer.

The calculation of syndromes is respectively carried out as:

$$S_0 = \sum_{i=0}^{n-1} \hat{w}_i$$

$$S_1 = \sum_{i=0}^{n-1} \alpha^i \hat{w}_i$$

$$S_2 = \sum_{i=0}^{n-1} \alpha^{2i} \hat{w}_i$$

$$S_3 = \sum_{i=0}^{n-1} \alpha^{3i} \hat{w}_i$$

The presence or absence of error can be detected by determining whether the following equation is satisfied.

$$S_0 = S_1 = S_2 = S_3$$

When this equation is satisfied, there is no error. In practice, $(S_0 \oplus S_1 \oplus S_2 \oplus S_3) \oplus S_0$ is calculated, where $\oplus$ represents modulo 2 addition, and when the result of this calculation is "0", it is judged that there is no error.

Error corrrection begins with the operation to decide the position of error. For one word error, the position of the error will be determined by searching for the error location i which satisfies $$S_0 = \alpha^{-i} S_1 = \alpha^{-2i} S_2 = \alpha^{-3i} S_3.$$

Executing the command of $$W_i = \hat{W}_i + S_0$$

in association with the error position i makes correction of one word error possible. As was already described, one word error is corrected both in the C1 and C2 decode modes.

Two words in error can be corrected only in the C2 decode mode, wherein the positions of errors can be identified on the basis of the C1 pointer if the two words error positions are taken as eror locations i and j and calculation of $$e_i = \frac{S_0 + \alpha^{-j} S_1}{1 + \alpha^{i-j}}$$

is performed, error pattern $e_i$ can be obtained. The other error pattern $e_j$ is given by $$e_j = e_i + S_0$$

Thus, executing the commands given as:

$$w_i = \hat{w}_i + e_i$$

$$w_j = \hat{w}_j + e_j$$

allows two words error to be corrected.

The contents for control, which the respective bits A to H in the control field of the aforesaid microprogram execute, correspond to respective commands by which calculation of syndromes, judgement of error, and error correction are performed and are indicated in the following table 1.

TABLE 1

| bit | branch field "1" | branch field "0" |
|---|---|---|
| A | calculation of $\alpha^{-i}$ | calculation of syndromes |
| B | $w_i w_i + S_0$ | identification of $S = 0$ |
| C | RAM in the read mode | RAM in the write mode |
| D | calculation of syndromes is possible | calculation of syndromes is inhibited |
| E | calculation of $S = 0$ | calculation of syndromes |
| F | no-operation | microprogram-end |
| G | no-operation | "1" → data bus (pointer is raised) |
| H | no-operation | "0" → data bus (pointer is cleared) |

In order that the afore-described formats may easily be understood, an example of a format in which syndromes of a predetermined data block in the C1 mode are calculated will be described with reference to FIG. 10.

In the example of the format shown in FIG. 10, the branch field has the content of "00", which indicates a format in the no-operation state. 8 bits from A to H in the control field have the contents all indicated as "00110111", and from the contents of table 1, the following are understood: calculation of syndromes is (A=0), identification of S=0 is (B=0), the read mode of RAM 37 is (C=1), calculation of syndromes is possible is (D=1), calculation of syndromes is (E=0), and the others are no-operations (F,G,H=1). In the RAM address field, the respective contents becomes 3F, 3E, 3D, 3C ... 30 ... 2F ... 23 so that 32 words in the block are respectively read out, where the RAM address field is expressed by hexadecimal base numerals.

In the format of a microprogram according to this embodiment, two formats are employable dependent on the branch fields, whereby when the jummp address is not required all of the control fields can be assigned to the control signal. Therefore, the step that requires no branching enables many more function blocks to execute the command so that, by following the present invention, the number of bits contained in one step can be reduced.

Figure 11:
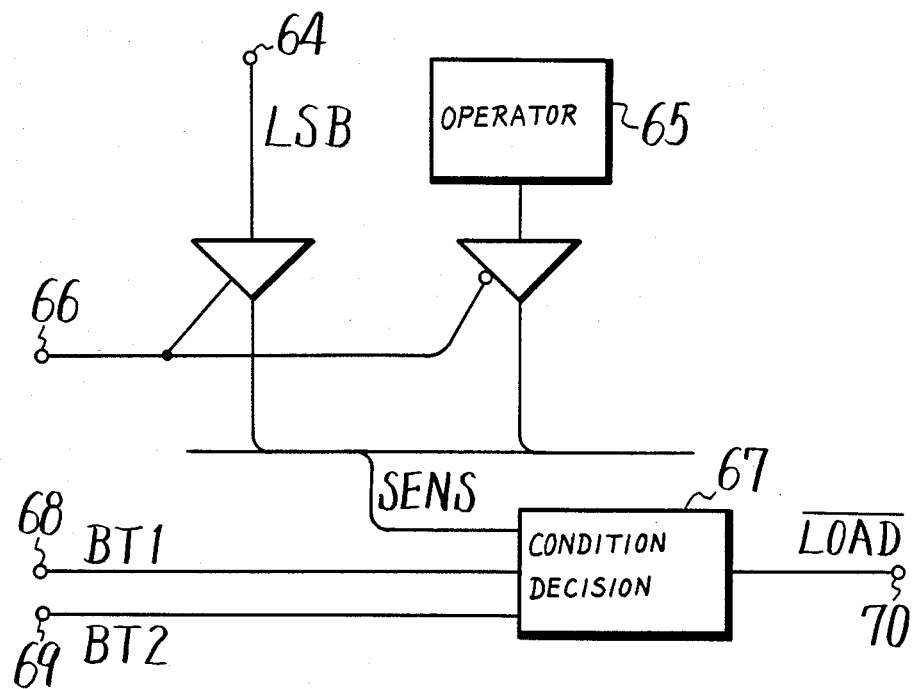
FIG. 11 is a schematic block diagram of a circuit to use the formats of FIGS. 9A and 9B.

To identify the contents of the above branch field, there can be used a circuit shown in FIG. 11. In FIG. 11, input terminal 64 is supplied with a least significant bit (LSB) of the data bus that is fed to a switch. Arithmetic operator circuit 65 executes a predetermined calculation and has an output also fed to a switch. A control signal through a control signal input terminal 66, that could be one bit of the microprogram, for example, is employed to switch selectively a signal from operator input terminal 64 or a signal from arithmetic operator circuit 65, whereby a signal labelled SENS is supplied to condition judgement circuit 67. The condition judgement circuit 67 is a combinational circuit for establishing a truth table as shown in table 2, in which input terminals 68 and 69 are supplied with two bits of BT 1 and BT 2 in the branch field, respectively. The output from condition judgement circuit 67 is supplied to load terminal 70 of program counter 48 of FIG. 7, whereby the condition "1" means to transfer the jump address to the program counter 48, whereas when "0" is produced the content of the branch field is "no-operation".

TABLE 2

| BT1 | BT2 | SENS | LOAD |
|-----|-----|------|------|
| 0   | 0   | X    | 1    |
| 1   | 0   | X    | 0    |
| 0   | 1   | 1    | 0    |
| 0   | 1   | 0    | 1    |
| 1   | 1   | 1    | 1    |
| 1   | 1   | 0    | 0    |

Figure 12:
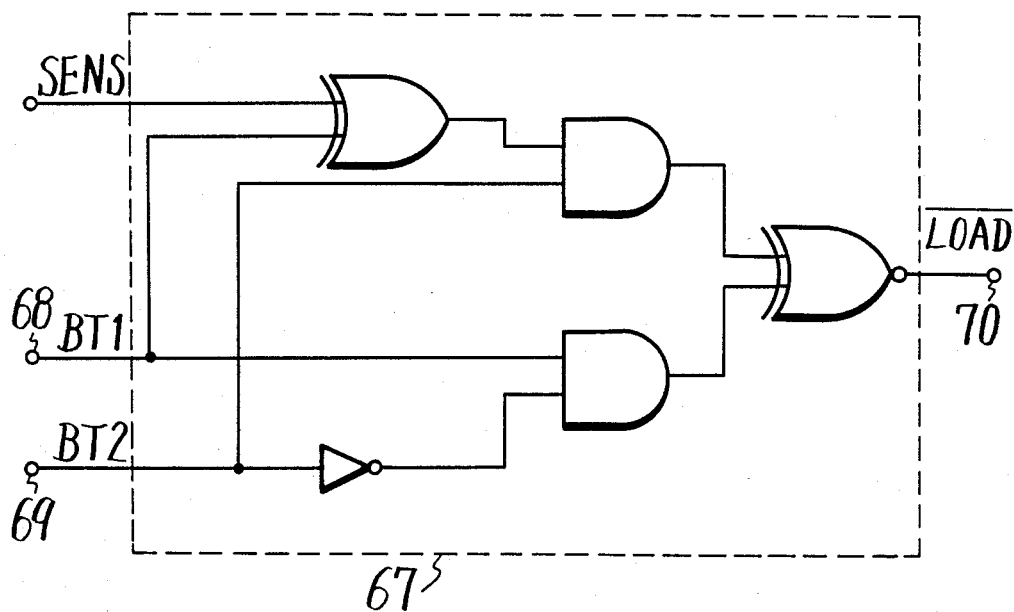
FIG. 12 is a logic circuit which may constitute a condition decision unit in the circuit of FIG. 11.

The circuit arrangement shown in FIG. 12 can be formed from the truth table of Table 2 following conventional well-known design techniques.

Next, an embodiment of an arithmetic circuit for one word error correction for use in this invention, as shown at 50 in FIG. 7, will be described with reference to FIG. 13. Arithmetic circuit for one word error correction 50 comprises circuit units 71, 72, 73, and 74 that generate the syndromes $S_0$, $S_1$, $S_2$, and $S_3$, respectively. Then, the circuit units 72, 73, and 73 multiply the syndromes $S_1$, $S_2$, and $S_3$ with $\alpha^{-i}$, $\alpha^{-2i}$, and $\alpha^{-3i}$, respectively.

In this case, words of the block are sequentially transmitted through data selectors 75, 76, and 77 to adders 78, 79, and 80, respectively, and also directly to adder 81. The word transmitted to adder 78 is fed back to adder 78 via latch 82 that receives its input directly from the adder, so that circuit unit 71 produces the syndrome $S_0$. The word transmitted to adder 79 in circuit unit 72 is fed back to adder 79 after it has been passed through $\alpha$-multiplier 83, data selector 84, and latch 85, so that the circuit unit 72 produces the syndrome $S_1$. Circuit unit 73 generates syndrome $S_2$ by feeding back a signal to adder 80 that is generated by passing the output from adder 80 through $\alpha^2$-multiplier 96, data selector 9A, and latch 95. Circuit unit 74 generates syndrome $S_3$ by feeding back a signal to adder 81 that is derived by passing the output of adder 81 through $\alpha^3$-multiplier 98, date selector 88, and latch 89.

The syndromes $S_0$ to $S_3$ thus obtained can be shifted and manipulated to provide: $(S_0 \oplus S_1 \oplus S_2 \oplus S_3 \oplus S_4) \oplus S_0$ To achieve this relationship, syndrome $S_3$ is supplied through data selector 77 to adder 80 so as to be added to the syndrome $S_2$, the added content $(S_3 \oplus S_2)$ is transmitted through data selector 76 to adder 79 and therein added with the syndrome $S_1$, and added content $(S_1 \oplus S_2 \oplus S_3)$ is transmitted through data selector 75 to adder 78, thereby added with the syndrome $S_0$. The added content $(S_0 \oplus S_1 \oplus S_2 \oplus S_3)$ thus obtained is added by adder 86 with the syndrome $S_0$, resulting in $(S_0 \oplus S_1 \oplus S_2 \oplus S_3) + S_0$. The result of this calculation is judged and the presence or absence of error based on such judgement. The result of this calculation is delivered through terminal 93 to other circuits and subsystems.

The position of error can be determined by dividing the syndromes $S_0$ to $S_3$ thus obtained by $\alpha^{-1}$, $\alpha^{-2}$, and $\alpha^{-3}$ in turn. In other words, the syndrome $S_3$ is circulated through $\alpha-3$-multiplier 87, data selector 88, and latch 89. Thus, i-th times circulations of the syndrome $S_3$ can yield $S_3\alpha$-3i. In like manner, $S_0$, $S_1^{\alpha-i}$, and $S_2^{\alpha-2i}$ are obtained in the other circuit units 71, 72, and 73. By checking whether $S_0$, $S_1^{\alpha-1}$, $S_2^{\alpha-2i}$, and $S_3^{\alpha--3i}$ are equal to one one other, the position of error is decided.

In association with i-th times circulations of the syndromes, the counter for error position counts up so that the error position address is determined by the content of this counter. One approach to yield the error position address would be to employ a ROM. RAM 37 can be accessed by transmitting the error position address to decode address generator 45 of FIG. 7 to designate the pointer.

After calculation of syndromes and generation of the error position address, correction of one word error is carried out. That is, error word $w_i$ is read out in association with the error position address and then transferred to latch 90. Error word $w_i$ stored in latch 90 is added with the syndrome $S_0$ of another latch 82 by adder 91, which means $w_i \leftarrow w_i \oplus S_0$, thus, error correction is carried out by this addition. The word $w_i$ corrected for error is written in RAM 37 via buffer 92 and data bus 43.

Figure 13:
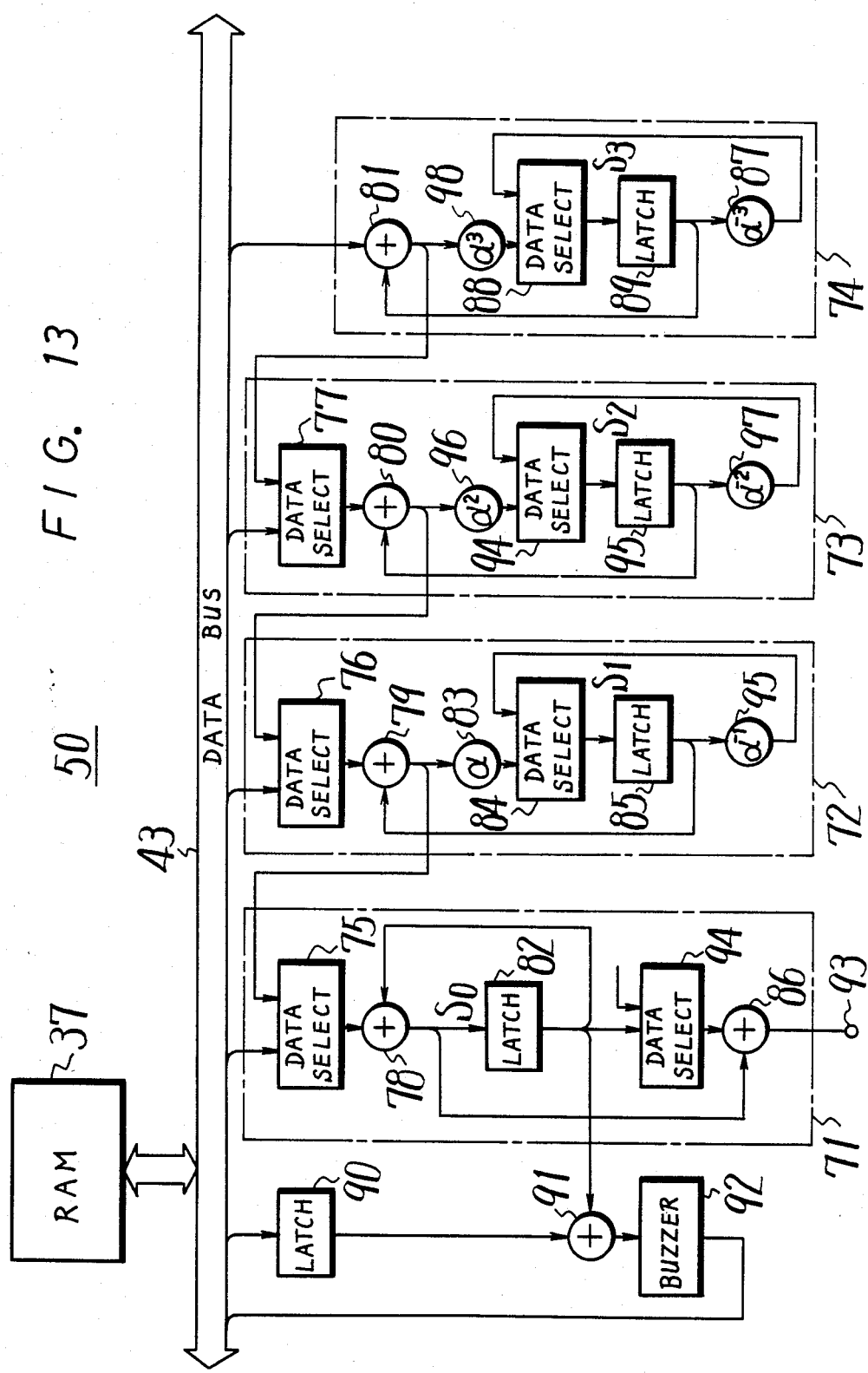
FIG. 13 is a schematic block diagram showing an arithmetic circuit for one word error correction in the decoding section of FIG. 7.

In circuit unit 71 of FIG. 13, reference numeral 94 denotes a data selector, similarly, in the circuit unit 72, reference numeral 95 denotes an $\alpha^{-1}$-multiplier, in the circuit unit 73, reference numeral 96 denotes an $\alpha^2$ multiplier and reference numeral also 97 denotes an $\alpha^{-2}$-multiplier, and in the circuit unit 74, reference numeral 98 denotes an $\alpha^3$-multiplier.

Figure 14A:
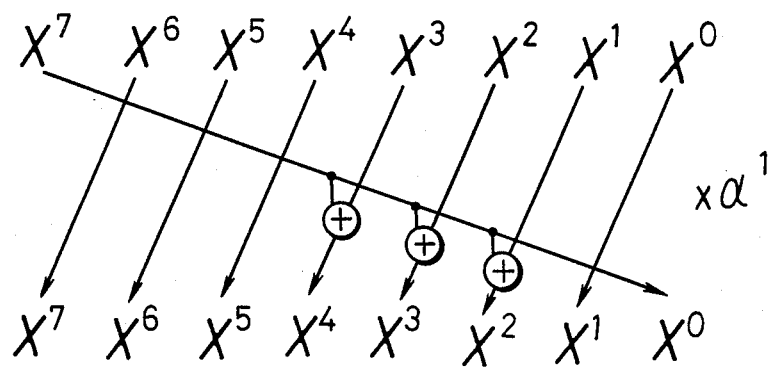
FIGS. 14A to 14C are schematic diagrams showing examples of an $\alpha$-multiplier, an $\alpha^2$-multiplier, and a $\alpha^3$-multiplier, respectively, for use in the circuit shown in FIG. 13.
Figure 14B:
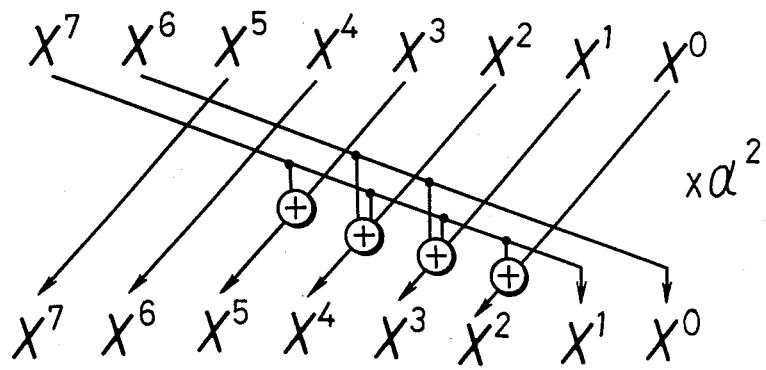
Figure 14C:
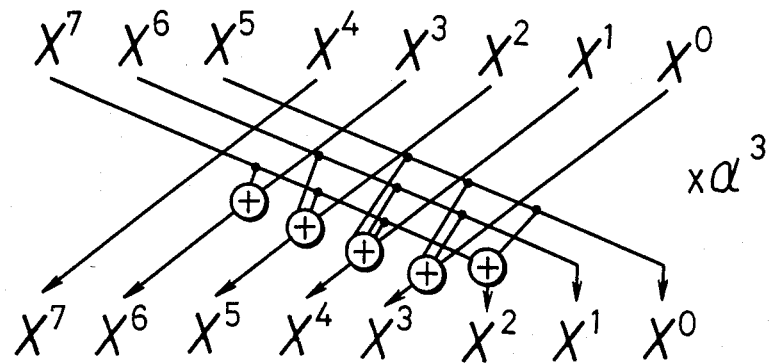
Figure 15A:
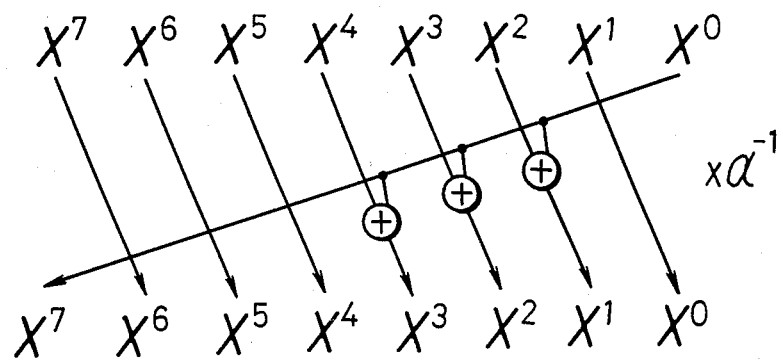
FIGS. 15A to 15C are schematic diagrams showing examples of an $\alpha^{-1}$-multiplier, an $\alpha^{-2}$-multiplier, and an $\alpha^{-3}$-multiplier, respectively, for use in the circuit shown in FIG. 13.
Figure 15B:
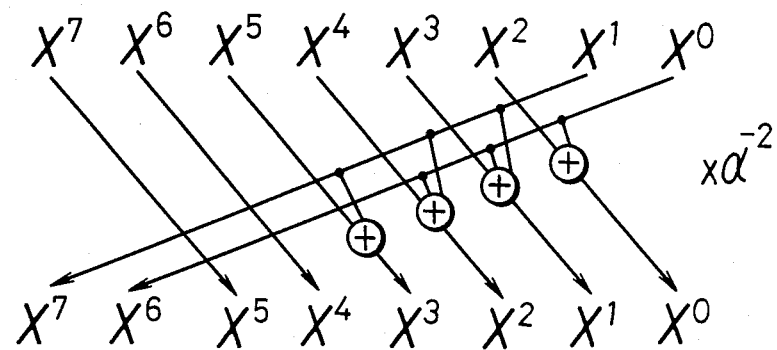
Figure 15C:
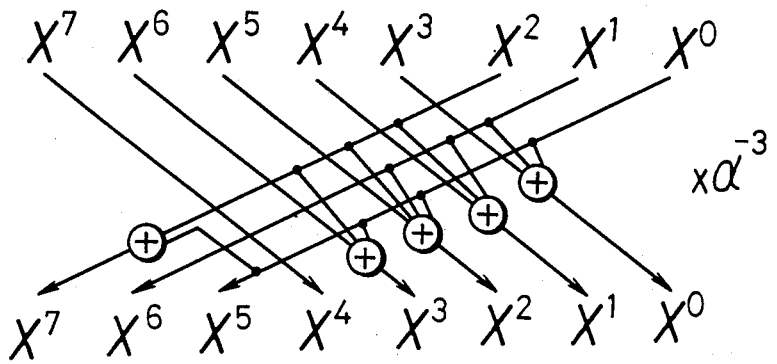

With this embodiment, multipliers 83, 96, and 98 for multiplications of $\alpha^1$, $\alpha^2$, and $\alpha^3$, respectively, are arranged as shown in FIGS. 14A, 14B, and 14C. Throughout FIGS. 14A to 14C, symbols $\oplus$ each represent modulo 2 addition. Multipliers 83, 96, and 98 can be formed of exclusive-OR circuits in this embodiment. If it is taken into consideration that multiplications of $\alpha^1$, $\alpha^2$, and $\alpha^3$ respectively correspond to shifting location of respective data by "1", "2", and "3" on Galois field $GF(2^8)$ and the generation polynominal is $X^8 + X^4 + X^3 + X^2 + 1$, this can easily be understood. Similarly, multipliers (dividers) 95, 97, and 87 for $\alpha^{-1}$, $\alpha^{-2}$ and $\alpha^{-3}$ are arranged as shown in FIGS. 15A, 15B, and 15C respectively.

According to this embodiment, the decoding section is arranged not by random discrete logic elements, as in the prior art but by microprogram system, so the ROM can be used many times and thereby chip size can be kept small. Besides, it is possible to judge accurately which one of the programs to be loaded to the ROM is optimum. With this embodiment, since the common bus is employed, logic is further simplified so that more satisfactory designing of circuitry is ensured. Moreover, priority control circuit 46, of FIG. 7 executes reading and writing the address of RAM 37, namely, executes the de-interleaving processing and error correction in a time sharing manner, so that decoding becomes efficient. Besides, since the respective function circuits are arranged in parallel to one other and controlled by the horizontal microprogram system, respective commands can be executed simultaneously, resulting in more efficient decoding.

Furthermore, the format of the microprogram is combined with the branch field, whereby the microprogram requiring branching can be discriminated from that requiring no branching. The microprogram requiring branching contains therein the jump address, while the control bits of the microprogram requiring no branching can expand its number of control bits by the number of bits that normally would be assigned to the jump address, so that many more commands can be executed with smaller capacity of ROM.

Figure 16:
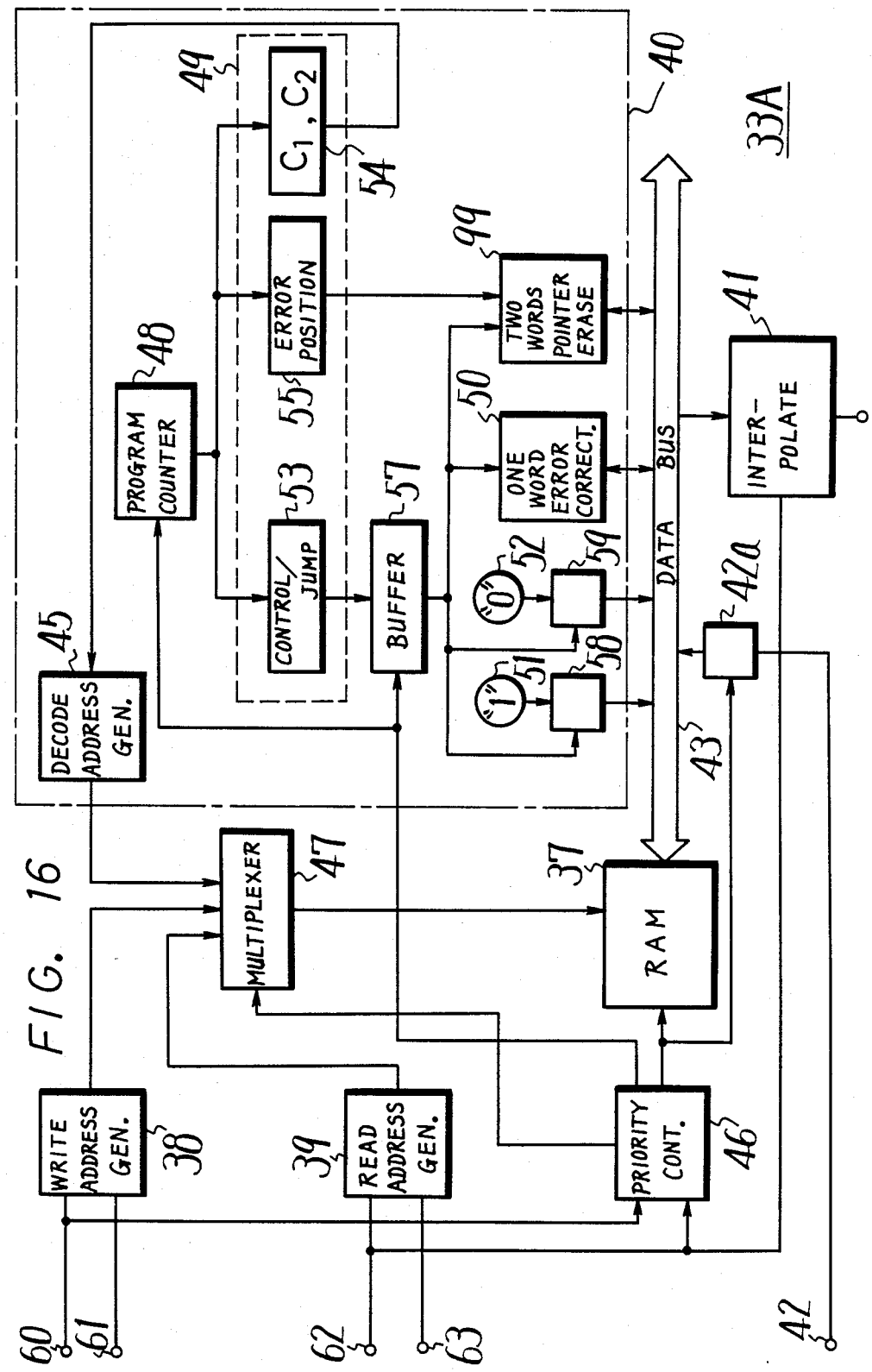
FIG. 16 is a schematic block diagram showing another embodiment of a decoding section schematic for use in apparatus for error correction according to the present invention.

Another embodiment of apparatus for error correction according to the present invention will be described with reference to FIGS. 16 to 20. FIG. 16 shows a circuit arrangement of decode section 33A according to a second embodiment of the invention, wherein like parts corresponding to those of FIG. 7 are marked with the same reference numerals and will not be described in detail. In FIG. 16, the arithmetic circuit for one word error correction 50 of FIG. 7 is modified and an arithmetic circuit for erasing two words pointer 99 is added. In this second embodiment, referring to the pointer raised in the C1 decode mode, the position of word containing error is closely watched in the C2 decode mode, whereby error, if it is actually two words error, can also be corrected.

Figure 17:
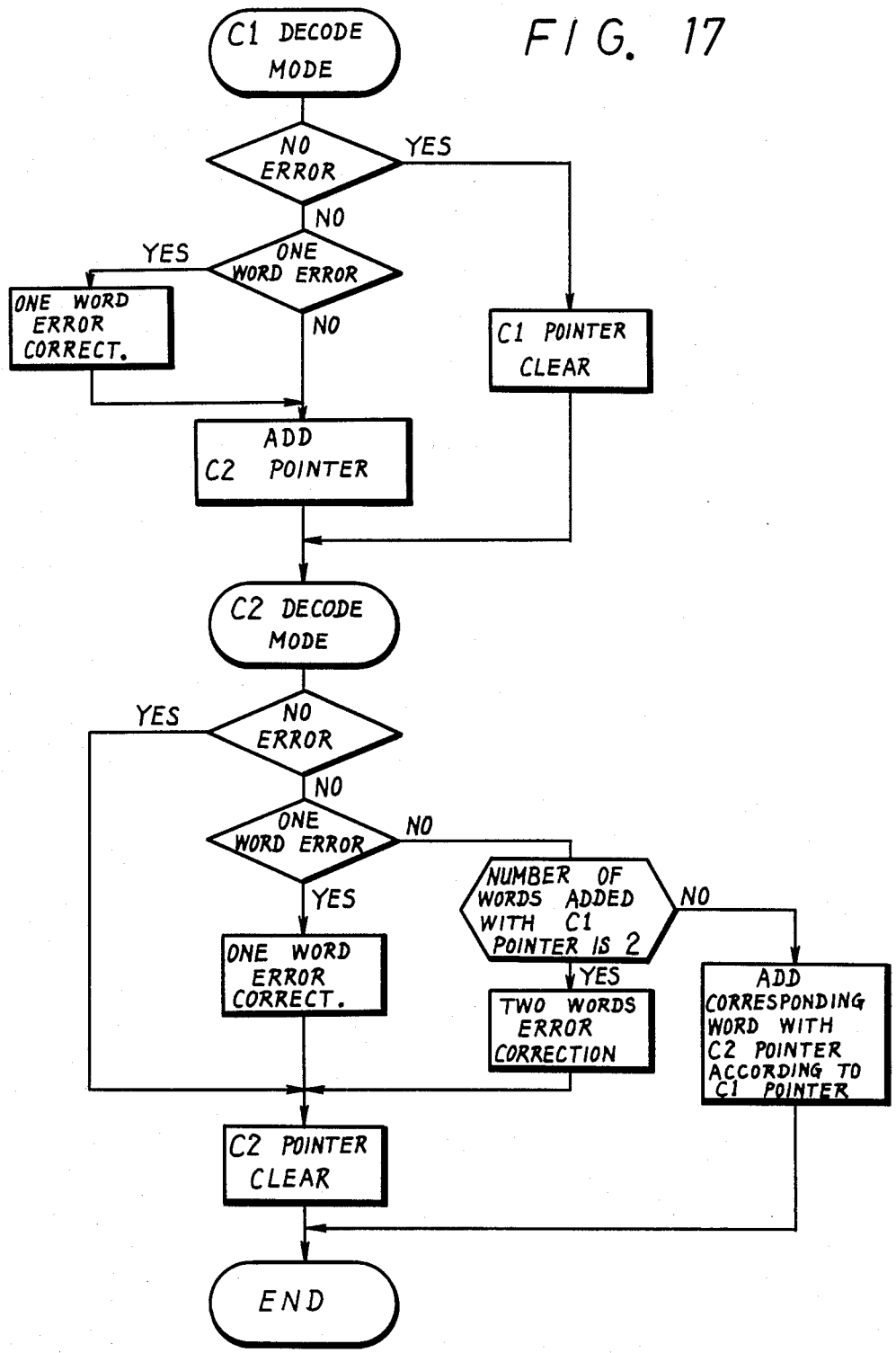
FIG. 17 is a flow chart used to explain the operation of the decoding section in FIG. 16.

The second embodiment of the present invention will now be described in conjunction with a flow chart of FIG. 17. Similar calculation processing to that of FIG. 8 is carried out in the C1 decode mode, while the calculation of syndromes is first performed in the C2 check mode, thereafter, judgement is made of whether error exists or not. For no error, C2 pointer is cleared. For error, judgement is made of whether the error is one word error; if it is one word error, error correction is carried out and then C2 pointer is cleared. If error is not one word error but plural words error, the number of C1 pointers in the C1 decode mode is counted to identify whether or not it is "2". If "2", correction of two words error is carried out and C2 pointer is also erased. On the other hand, when the number of words to which C1 pointer is added is "3" or more, C2 pointer is added thereto in response to C1 pointer, whereby interpolation can be made in association therewith.

Figure 19:
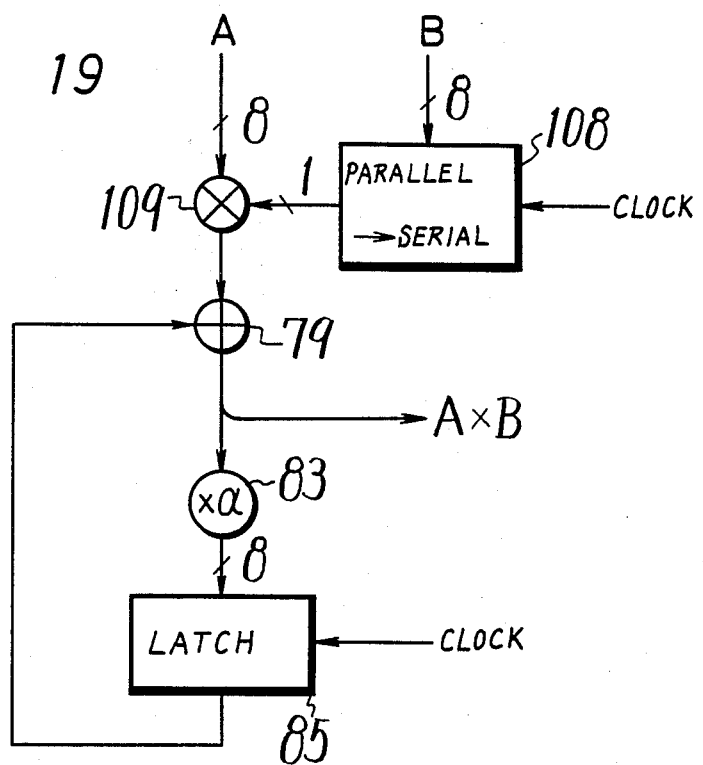
FIG. 19 is a schematic block diagram showing details of a portion of the circuit of FIG. 18.

Next, arithmetic circuit for one word error correction 50 and arithmetic circuit for erasing two words pointer 99 will be described with reference to FIGS. 18 and 19. In this embodiment, as will be described below, adding a $(1+\alpha i-j)^{-1}$ generation circuit 100 to the arithmetic circuit for one word error correction 50A makes it possible for the arithmetic circuit for one word error 50A to correct two words error.

In FIG. 18, the arithmetic circuit for one word error correction 50A, when in the C1 decode mode, calculates the syndromes to correct one word error and operates otherwise in accordance with the embodiment described in connection with FIG. 13.

Whereas, as was described before, correction of two words requires solving the following equation for error pattern of $e_i$ as:

$$\frac{S_0 + \alpha^{-j}S_1}{1 + \alpha^{i-j}}$$

In the above calculation, the denominator term of $(1+\alpha^{i-j})$ is calculated by the $(1+\alpha^{i-j})^{-1}$ generation circuit 100, and then $(1+\alpha^{i-j})^{-1}$ is multiplied with $(S_0+\alpha^{-j}S_1)$ and corrected in the circuit unit 72A.

The $(1+\alpha^{1-j})^{-1}$ generation circuit 100 carries out the calculation with a so-called look-up table using a ROM or programmable logical array (PLA). To be more specific, error position data i and j from error position address generator 55 of FIG. 16 are transferred in turn through control bus 101 to error position registers 103 and 102. Then, the error position data i and j are added together in in adder 104, thereby producing as data (i−j). The data from error position register 103 is fed to adder 104 via inverter 105. The output from adder 104 is supplied to, for example, ROM 106 that has memorized therein a table for converting (i−j) to $(1+\alpha^{i-j})^{-1}$ so that ROM 106 produces as its output $(1+\alpha^{i-j})^{-1}$. The result of the calculation is then transferred to register 107.

The numerator term $(S_0+\alpha^{-j}S_1)$ is generated as follows. In circuit unit 72A, data from latch 85, namely, syndrome $S_1$ is circulated through a loop of $\alpha^{-1}$-multiplier 95, data selector 84 and latch 85 j times so that latch 85 generates $\alpha^{-j}S_1$. The $\alpha^{-j}S_1$ made so far is transmitted via adder 79 and data selector 75 to adder 78 in the other circuit unit 71, while syndrome $S_0$, retained in latch 82, is transmitted to adder 78, whereby $(S_0+\alpha^{-j}S_1)$ thus made is transferred to latch 82.

The numerator term and denominator term made so far are multiplied with each other on Galois Field GF $(2^8)$ by serial-to-parallel converter 108, multiplier 109, $\alpha$-multiplier 83, and adder 79.

Elements resulting from eliminating the zero element from Galois field GF $(2^n)$ constitute a cyclic group. Elements A and B, without zero element, are expressed as $A=\alpha^i$ and $B=\alpha^j$, and as to its multiplication $A \times B$, it is expressed as $A \times B=(\alpha^i)\times(\alpha^j)=\alpha^{i+j}$.

Consequently, with a conversion table for converting elements to the locations thereof and a reverse conversion table, the result of multiplication $A \times B$ are converted by the conversion table to their locations i and j. Thereafter, the locations i and j are added to yield (i+j), and then (i+j) is further converted by the reverse conversion table to $A \times B(=\alpha^{i+j})$ Although such conversion and reverse conversion can be realized by using a read only memory (ROM) or similar devices, such arrangement requires a ROM with capacity of 256 bytes on Galois field GF $(2^8)$, leading to a complex circuit arrangement. Furthermore, if the field order $2^8$ is increased, and if it becomes $2^9$, capacity of the ROM has to be abruptly increased to 1024 bytes, which is four times as large as the former capacity.

Figure 20A:
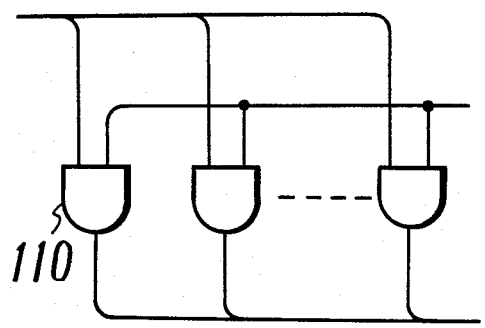
FIGS. 20A and 20B are logic circuit diagrams of functional blocks shown in FIG. 18.
Figure 20B:
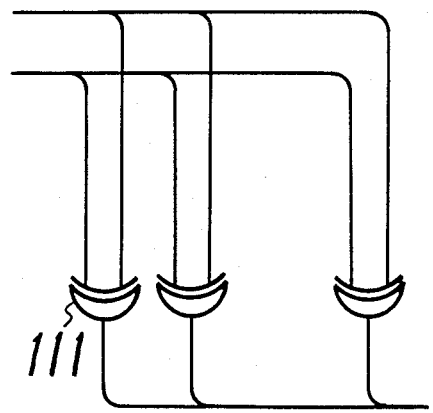

Therefore, with the second embodiment of the present invention, the aforesaid multiplication $A \times B$ is carried out as follows. This will hereinafter be described with reference to FIG. 19, which results from omitting portions of FIG. 18 to facilitate the understanding thereof. In FIG. 19, data A $(=(1+\alpha^{i-j})^{-1})$ (the denominator) is supplied to 8-bit multiplier 109 (modulo 2) as parallel data on eight parallel input lines. Multiplier 109 comprises eight AND circuits 110 each having two inputs, as shown in FIG. 20A. Data B ($=S_0+\alpha^{-j}S_1$) (the numerator) is converted by parallel-to-serial converter 108 to serial data and then supplied to multiplier 109. The output from multiplier 109 is fed back to adder 79 (modulo 2) after passing through adder 79, through $\alpha$-multiplier 83, and latch 85. Adder 79 comprises eight exclusive-OR circuits 111 of the two-input kind, as shown in FIG. 20B.

With this arrangement and using a clock signal of eight bits or when serial data is transmitted in eight bit bytes, the multiplication on Galois field GF ($2^8$) is carried out. If, now, element A is taken as $\alpha^{20}(=10110100)$ and element B is taken as $\alpha^9(=00111010)$ and elements A and B are multiplied with each other, as the output of adder 79, the following calculation results are achieved for respective clocks, namely, from 1st to 8th clock.

|  |  |
| --- | --- |
| 1st clock | ; 0 0 0 0 0 0 0 0 |
| 2nd clock | ; 0 0 0 0 0 0 0 0 |
| 3rd clock | ; 1 0 1 1 0 1 0 0 |
| 4th clock | ; 1 1 0 0 0 0 0 1 |
| 5th clock | ; 0 0 1 0 1 0 1 1 |
| 6th clock | ; 0 1 0 1 0 1 1 0 |
| 7th clock | ; 0 0 0 1 1 0 0 0 |
| 8th clock | ; 0 0 1 1 0 0 0 0 | where it is clear that 00110000 represents $\alpha^{29}$ and this value corresponds to the multiplication $A \times B$. It is here that the aforesaid multiplication has a generality that will be proved.

Element on Galois field GF ($2^n$) is given below by vector presentation:

$$a_{n-1}\alpha^{n-1}+a_{n-2}\alpha^{n-2}+ \ldots +a_1\alpha+a_0$$

If, now, $N=8$ is established, data A and B are expressed as:

$$A = a_7\alpha^7 + a_6\alpha^6 + \ldots + a_1\alpha + a_0$$
$$B = b_7\alpha^7 + b_6\alpha^6 + \ldots + b_1\alpha + b_0$$

multiplication $A \times B$ is given as below:

$$A \times B = b_7 \cdot A \cdot \alpha^7 + b_6 \cdot A \cdot \alpha^5 + b_4 \cdot A \cdot \alpha^4 +$$
$$b_3 \cdot A \cdot \alpha^3 + b_2 \cdot A \cdot \alpha^2 + b_1 \cdot A \cdot + b_0 \cdot A$$

thus, yielding $$A \times B = (((((((b_7A \cdot A \cdot \alpha + b_6 \cdot A) \cdot \alpha + b_5 \cdot A) \cdot \alpha +$$
$$b_4 \cdot A) \cdot \alpha + b_3 \cdot A) \cdot \alpha + b_1 \cdot A) \cdot \alpha + b_0 \cdot A).$$

Accordingly, it is apparent that the multipication on Galois field GF ($2^8$) can be carried out by the aforesaid calculation. That is, it should be noted that all calculations in the parentheses in the above equation can be expressed by $x \cdot \alpha + b_i \cdot A$. By way of example, in the first calculation, $i=6$ and $x=b_7 \cdot A$ are established, and in the next calculation, $i=5$ and $x=(b_7 \cdot A \cdot \alpha+b_6 \cdot A)$ are established. For this reason, a circuit for calculating the $x \cdot \alpha b_i \cdot A$ is formed of gate circuits and the result of calculation brought by this circuit is circulated to execute in turn calculations from the term in the innermost parentheses.

Although the arrangement made so far needs a clock of n bits, namely eight bits in this embodiment, the circuit arrangement can be quite simplified. By way of example, the prior art multiplier employing the ROM is required to carry out the look-up table operation of the ROM for converting locations of elements to element and reverse conversion thereof, so that if $n=8$ is given, capacity of 512 bytes is required for the ROM. Let n be assumed to be 9, then 1024 bytes are required, whereas, according to the system of this invention, the circuit arrangement can be formed of approximately only forty circuit elements such as flip-flop circuits, AND circuits, exclusive-OR circuits, and so on. It should particularly be noted that even if the number of bits contained in data is increased, the circuit arrangements do not have be made much more complex. In other words, in the case of employing the prior art ROM, if n is increased by 1, the ROM is generally required to have a capacity twice as large as it had before. However, in accordance with the system of this invention, it is sufficient to increase merely the number of gate circuits. Accordingly, if n is increased from 8 to 9, the number of circuit elements is only increased from 40 to 50.

As described above, error pattern $$e_i = \frac{S_0 + \alpha - jS_1}{1 + \alpha^{i-j}}$$

is produced as the output of adder 79 in circuit unit 72A. Referring again to FIG. 18, this error pattern $e_i$ is supplied to adder 91 via data selector 112, while adder 91 is also supplied with error word $w_i$ via latch 90, so that adder 91 carries out error correction of $w_i \leftarrow \hat{w}_i + e_i$.

Since the other error pattern $e_j$ results from $e_j \leftarrow S_0 + e_i$, adder 113 carries out this addition. As regards the error pattern $e_j$ thus obtained, adder 91 executes the error correction of $w_j \leftarrow \hat{w}_j + e_j$.

With the second embodiment described so far, it can easily be understood that operations and effects similar to those of the first embodiment can be achieved. Moreover, according to the second embodiment, since error correction in the C1 decode mode is reliable, whether or not two words error is identified by the error pointer, and, if so, up to two words error can be corrected, thus improving error correction ability.

Furthermore, according to the second embodiment of the invention, the multipliers for producing the error patterns are formed of gate circuits. That is, the element A as a parallel data and the element B as a serial data are multiplied by multiplier 109 at n clocks (eight clocks in practice) and the result of multiplication at each clock is made to circulate through the loop of adder 79, $\alpha$-multiplier 83, and latch 85, and thereby added to one another. In this case, adder 79 and multiplier 109 are formed of the gate circuits, as shown in FIG. 20, and $\alpha$-multiplier 83 is also formed of the gate circuits, as was described in connection with FIG. 14. Therefore, while eight clocks are required to execute the multiplication, the circuitry thereof can be greatly simplified. Also, there is then an advantage that in spite of increased bit numbers of the elements, the number of gates required is small.

Particularly when the elements on Galois field GF ($2^n$) are multiplied to correct two words error in the apparatus for error correction, such apparatus can be achieved by simple arrangement and error correction ability resulting from correcting two words error can be improved easily.

As described above, according to the apparatus for error correction of this invention, operations of error correction and pointer addition can be executed simultaneously (in parallel) by the microprogram stored in the memory, so efficiency of calculation processing can be improved. Moreover, due to the microprogram, hardware in the prior art random logic can be replaced by firmware, thus the circuit arrangement being further simplified.

This invention is not limited to the aforesaid embodiments, but can take various modifications without departing from the spirit of the invention. For example, in the first embodiment, one word error is detected in the C2 decode mode. When this error word is not added with the C1 pointer, it is judged that erroneous decoding was carried out, and the C2 pointer is added to all words in the block. In this case, if there are four C1 pointers of the C1 decode mode, it is judged that four words error were erroneously decoded as one word error in the C2 decode mode (the first embodiment is more likely to cause such error than the second). Accordingly, only the word to which the C1 pointer was added may be interpolated.

Also, it is possible that up to two words error may be corrected in the C1 decode mode.

The above description is directed to the preferred embodiments of the invention, but it will be apparent that many modifications and variations could be effected by one skilled in the art without departing from the spirit or scope of the novel concepts of the invention, so that the scope of the invention should be determined by the appended claims only.

What is claimed is:

1. Apparatus for correcting errors in data sequences formed of plural, time-base arranged data words and check words that are written into a read/write memory under control of a write address generator and are subsequently read out of the read/write memory under control of a read address generator so as to generate rearranged data sequences, the apparatus comprising:
    arithmetic error word correction means connected to said read/write memory for performing error correction calculations on a data word to be corrected;
    pointer addition means;
    circuit means connecting said pointer addition means to said read/write memory;
    said pointer addition means being responsive to an error state of said sequences for adding a pointer to said data words; and
    read-only memory means containing a control microprogram for arranging said read-only memory means in fields for controlling the operation of said arithmetic error word correction means and of said pointer addition means and to provide a data word address signal representative of a word to be corrected for error.

2. An apparatus for correcting errors according to claim 1; in which said arithmetic error word correction means comprises means for generating a plurality of error syndromes of said data words.

3. An apparatus for correcting errors according to claim 2; in which said arithmetic error word correction means further comprises means for generating corresponding elements of a Galois field GF $(2^n)$, said corresponding elements being powers of an irreducible root of a generation polynomial on said Galois field GF $(2^n)$, and for multiplying said error syndromes by said corresponding elements.

4. An apparatus for correcting errors according to claim 1; wherein said circuit means comprises data bus means connected to said read/write memory, whereby data sequences can be supplied as inputs to and outputs from said read/write memory, said arithmetic error correction means and said pointer addition means being operably connected to said data bus.

5. An apparatus for correcting errors according to claim 1; further comprising decode address generator means responsive to said data word address signal for producing a decode address specifying a word to be corrected for error, said decode address being fed to the read/write memory, whereby the specified data word is read out from the read/write memory and fed to said arithmetic error word correction means in which said specified data word is corrected for error.

6. An apparatus for correcting errors according to claim 1; further comprising control signal/jump address generator means under control of said microprogram in said read-only memory means for providing a control signal to cause said arithmetic error word correction means to perform a predetermined computation for error correction of each specified data word fed out of said read/write memory in response to said data word address signal.

7. An apparatus for error correction according to claim 1; in which said microprogram has a format containing a branch field, a control field, and a random-access memory field, and including means operative, when said branch field indicates the presence of a jump instruction and a condition therefor is present, for assigning a portion of said control field to a jump address.

8. An apparatus for error correction according to claim 1; in which said error correction arithmetic means includes a Galois field multiplication circuit for sequentially multiplying parallel data of n bits composing an element A of Galois field $(2^n)$ with each bit of serial data of n bits composing an element B of said Galois field $(2^n)$, adder means by which data of n bits at an output of said multiplication circuit are fed for multiplication by a root $\alpha$ of a generation polynomial on said Galois field $(2^n)$, and means by which resultant data of the last-mentioned multiplication are delayed by one bit each and fed back to said adder means to compute $A \times B$ on said Galois field $(2^n)$.

9. An apparatus for correcting error in accordance with claim 1; further comprising pointer erase means connected to said circuit means for erasing two pointer words and being connected to receive error position signals from said read only memory, said pointer erase means being controlled by said microprogram, whereby if no error is found said pointers are erased.

10. An apparatus for error correction in which data sequences containing blocks formed of data words and check words arranged on a time-base are written into and read out of a read/write memory under control of a write address generator and a read address generator, respectively, to generate rearranged data sequences, said apparatus effecting error corrections during writing and reading of said data sequences and comprising:
    error correction arithmetic means connected to said read/write memory for performing a predetermined error correction calculation on said data words;
    pointer addition means;
    circuit means connecting said pointer addition means to said read/write memory;

said pointer addition means being responsive to identification of an error state of said data blocks for adding a pointer to selected data words; and read-only memory means containing a microprogram having fields to control said error correction arithmetic means and said pointer addition means and to supply an address signal representative of a word to be corrected for error.

11. An apparatus for error correction according to claim 10; in which said microprogram has a format containing a branch field, a control field, and a random-access memory address field, wherein said branch field indicates the presence of a jump and includes means for reforming a part of said control field to become a jump address.

12. An apparatus for error correction according to claim 10; in which said error correction arithmetic means includes a multiplication circuit of Galois field for sequentially multiplying parallel data of n bits composing an element A of Galois field GF ($2^n$) with each bit of serial data of n bits composing an element B of said Galois field GF ($2^n$), adder means to which data of n bits resulting from said sequential multiplying are fed for multiplication by root $\alpha$ of a generational polynomial on said Galois field GF($2^n$), and means whereby the results of said multiplication are delayed by one bit each and fed back to said adder means to compute A×B on said Galois field GF($2^n$).

* * * * *